United States Patent
Jitaru

(10) Patent No.: US 10,651,748 B2
(45) Date of Patent: May 12, 2020

(54) ENERGY RECOVERY FROM THE LEAKAGE INDUCTANCE OF THE TRANSFORMER

(71) Applicant: Rompower Technology Holdings, LLC, Milford, DE (US)

(72) Inventor: Ionel Jitaru, Tucson, AZ (US)

(73) Assignee: Rompower Technology Holdings, LLC, Milford, DE (US)

( * ) Notice: Subject to any disclaimer, the term of this patent is extended or adjusted under 35 U.S.C. 154(b) by 0 days.

(21) Appl. No.: 16/158,202

(22) Filed: Oct. 11, 2018

(65) Prior Publication Data

US 2019/0115845 A1 Apr. 18, 2019

Related U.S. Application Data

(60) Provisional application No. 62/571,594, filed on Oct. 12, 2017.

(51) Int. Cl.
| | | |
|---|---|---|
| *H02M 3/335* | (2006.01) | |
| *H02M 1/08* | (2006.01) | |
| *H01F 38/42* | (2006.01) | |
| *H02M 1/00* | (2006.01) | |
| *H02M 1/34* | (2007.01) | |

(52) U.S. Cl.
CPC ........ *H02M 3/33592* (2013.01); *H01F 38/42* (2013.01); *H02M 1/08* (2013.01); *H02M 3/335* (2013.01); *H02M 3/33569* (2013.01); *H02M 2001/0048* (2013.01); *H02M 2001/0058* (2013.01); *H02M 2001/342* (2013.01)

(58) Field of Classification Search
CPC ......... H02M 3/33592; H02M 3/33569; H02M 1/08; H02M 3/335; H02M 2001/342; H02M 2001/0048; H02M 2001/0058; H01F 38/42

See application file for complete search history.

(56) References Cited

U.S. PATENT DOCUMENTS 5,434,768 A * 7/1995 Jitaru ................ H02M 3/33569
363/131

* cited by examiner

*Primary Examiner* — Adolf D Berhane
*Assistant Examiner* — Afework S Demisse
(74) *Attorney, Agent, or Firm* — Thomas W. Galvani, P.C.; Thomas W. Galvani

(57) ABSTRACT

Electronic circuitry and method of operating the same to shape and reduce the circulating current through the active clamp in a flyback converter and to harvest most of the leakage inductance energy to provide the bias power. Methodologies for minimizing the circulating energy in the clamp circuit in order to improve efficiency of operation of the same. A method for using a portion of the leakage inductance energy in order to create zero voltage switching conditions at the main primary switch.

18 Claims, 19 Drawing Sheets

ENERGY RECOVERY FROM THE LEAKAGE INDUCTANCE OF THE TRANSFORMER

CROSS-REFERENCE TO RELATED APPLICATIONS

This patent application claims priority from and benefit of the U.S. Provisional Patent Application Ser. No. 62/571,594 filed on Oct. 12, 2017, the disclosure of which is incorporated herein by reference.

TECHNICAL FIELD

This invention pertains to electronic devices employing a power converter configured around a flyback topology and, in particular, to power converters and related methodologies directed to improvements of operation of such power converters achieved as a result of gainful harvesting and various usage, of energy of the leakage inductance of the flyback topology, in related electronic circuits.

BACKGROUND

The flyback topology is, arguably, one of the most used circuit topologies in the field of power conversion, especially in lower- to medium-power applications (such as AC-DC adapters, for example). The reason for high level of utilization of the flyback topology is rooted in its simplicity and low cost of implementation, as well as in the fact that the so-configured electrical circuitry can operate efficiently over a very large range of input voltage. In AC-DC adapter applications with powers under about 70 W, in order to gain a capability to be applicable substantially universally all over the worlds, the circuits formatted according to the flyback topology are used to operate after an output from a simple bridge rectifier, while the alternating-current input voltage ranges from 90 Vac to 264 Vac. (Conventionally, a rectifier is known an electrical device that converts alternating current to direct current, which flows in only one direction.)

To meet all the AC-voltage standards for different countries, when placed at the output of the rectifier, in the flyback converter has to be able to operate efficiently with a DC input voltage ranging from 127 Vdc to 375 Vdc (which is a range in which the ratio of the upper input voltage limit to the lower voltage limit is almost 3:1.) In addition to that, the new standards for power delivery require that the adapters provide a voltage output ranging from 5V to 20V (with the ration of the upper voltage limit to the lower voltage limit of 4:1, as far as the output voltage is concerned). Most of the forward-derived topologies (such as, for example, half-bridge topology, two-transistor forward topology, full bridge topology, to name just a few) are not able to operate efficiently over such large input and output voltage ranges provided by the transfer function of the flyback topology based circuit.

The trend for miniaturization of portable equipment (for example, portable computing devices such as laptops and tablets, for example) extends this demand even further, as a result of which the AC-DC adapters also became subject to these requirements. Presently, most of the laptops and tablets require, for operation, power ranging from 30 W to 65 W. The significant technological advancement in portable computing devices, the size of laptops and tablets has been significantly reduced while the AC-DC adapters used to power such devices remain quite large (for example, dimensions of a typical adaptor for a small tablet device are about 3.3" by 1.8" by 1.3" or so). This has created pressures for the size reduction of the AC-DC adapters. An ability to reduce the size of the required adapters while maintaining the convection-based cooling methodology used today requires some significant improvement in efficiency of the adapters as well as decrease of size of the magnetic and capacitive storage elements.

Over the years, the efficiency of the AC-DC adapters has been increased from about 70% to about 89-90% (in the most recent products such as the Apple 30 W adapter, for example), mostly due to the significant progress in semiconductor industry and a better understanding of magnetic technology. The flyback topology, however, possesses several drawbacks that limit its efficiency of operation. In most of the application the flyback-topology circuitry operates in a discontinuous mode. In a discontinuous mode of operation, the magnetizing current is first built up from zero to a peak level during the time period when the main switch is conducting; and after the main switch turns off, the magnetizing current flows into the secondary side winding and transfers the energy to the output capacitor until the value of the magnetizing current decreases to zero. This portion of the operation cycle is followed by a second period of time, referred as "dead time", when no energy is stored in the transformer or transferred to the secondary. Together, the first and second period of time characterize the discontinuous mode of operation of the flyback-topology circuits. When the "dead time" is reduced to the transition time which is the time interval wherein the voltage across the main switch decays from the level it had during the time when the magnetizing current flows into the secondary winding to its lowest level which occurs in the beginning of "dead time", this mode of operation is referred as a critical conduction mode of operation.

This disclosure presents several electronic-circuitry configurations that address the limitations conventionally associated with the flyback topology. The proposed solutions increase the efficiency of the flyback-topology-utilizing power converters above about 94%, decrease the level of dissipated heat and, as a result, produce a much higher power density (for example, above 27 W/in$^3$).

SUMMARY

Embodiments of the invention provide an electronic circuitry having primary and secondary sides and including (i) a flyback power converter that has an input voltage source; a transformer having primary and secondary windings, on the primary and secondary sides, respectively; a main switch in series with the primary winding on the primary side, and a synchronous rectifier in series with the secondary winding on the secondary side, and (ii) an active clamp circuit across the main switch, the active clamp circuit containing a clamp switch and the clamp capacitor in series with the clamp switch. Here, the clamp switch is configured to be turned on at a moment of time after the main switch is turned off, and to be turned off at a moment of time prior to the moment of time at which current passing through the secondary winding reaches a zero level. The electronic circuitry is characterized by a first value of rms current through the clamp capacitor. In a related embodiment, the electronic circuitry further includes an auxiliary circuit that contains two additional rectifiers connected in parallel with one another and in series with an electronic component configured to store electromagnetic energy (where a cathode of a first of the two additional rectifiers is directly electrically connected with a cathode of the active clamp circuit; where an anode of a second of the two additional rectifiers is directly electrically connected with the cathode of the first of the two additional rectifiers; where a cathode of the second of the two additional rectifiers is directly electrically connected with a first terminal of said electronic component; and where a second terminal of the electronic component is electrically connected with an anode of the second of the two additional rectifiers). Such auxiliary circuit, when added, is configured to reduce the rms current through the clamp capacitor from the first value to a second value, the second value being at least 40% lower than the first value.

A method for operating the above-identified electronic circuitry includes electrically-connecting the circuitry with an auxiliary electronic circuit in series with the clamp capacitor, where the auxiliary circuit contains two rectifiers and an auxiliary energy storage; and directing a current, flowing through a leakage inductance of the primary side in operation of said circuitry, to flow through the clamp capacitor and then through a first of the two rectifiers towards the auxiliary energy storage to change said first charge value to a second charge value. Here, the second charge value is smaller than the first charge value and a current passing through the clamp capacitor after the mains switch is turned off is a clamp capacitor current.

BRIEF DESCRIPTION OF THE DRAWINGS

FIG. 9 illustrates the key waveforms of operation of an embodiment including the flyback topology with an active clamp, where the clamp switch is turned on for a predetermined period of time prior to the moment when the main switch is turned on.

The sizes and relative scales of elements in Drawings may be set to be different from actual size and scales to appropriately facilitate simplicity, clarity, and understanding of the Drawings. For the same reason, not all elements present in one Drawing may necessarily be shown and/or labeled in another.

DETAILED DESCRIPTION

Utilization of various fly-back-topology-based circuits in power conversion devices is conventionally associated with ringing, in various waveforms characterizing the operation of a given power-conversion device, caused by the energy of leakage capacitance, which energy remains substantially lost. Embodiments of the invention address this problem of wasting such electromagnetic energy by devising subtle modifications of flyback-topology-based circuits that not only reduce such circulation but also—optionally—redirect this energy to be re-used by the conversion device.

Figure 1:
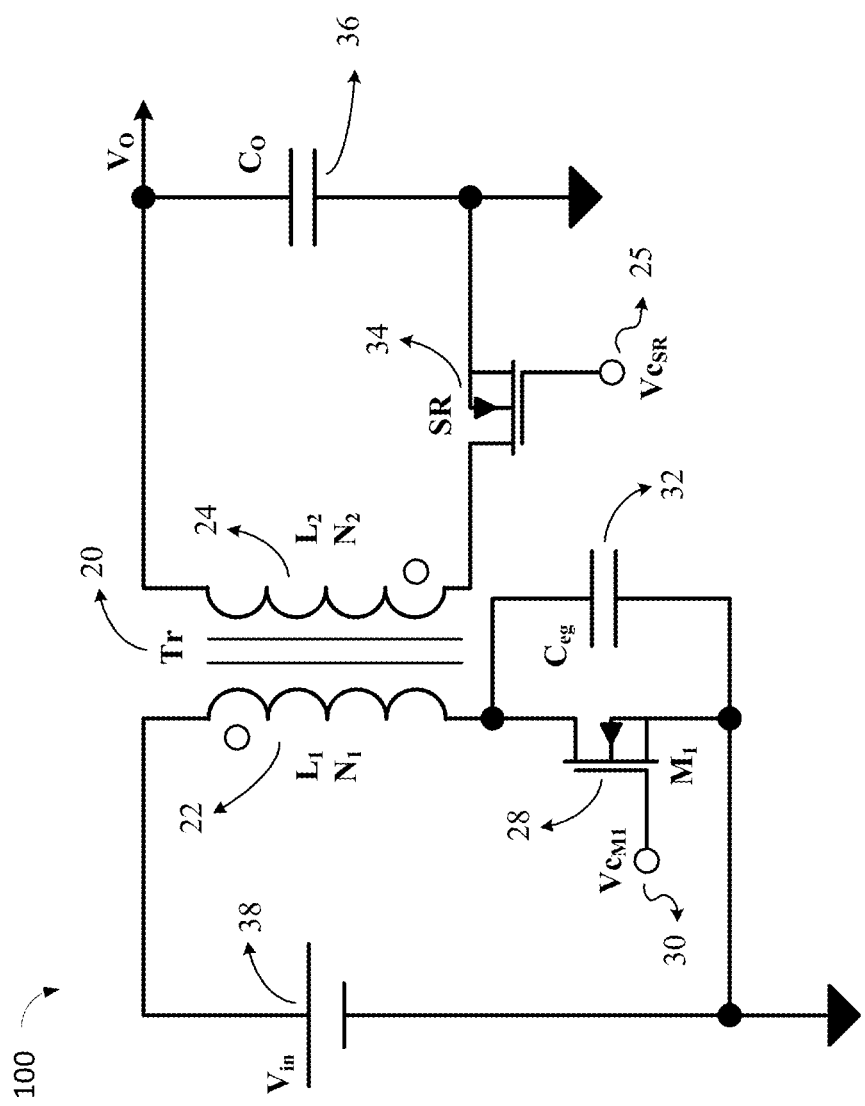
FIG. 1 depicts a conventional flyback topology utilizing synchronous rectification.

FIG. 1 illustrates a simplified schematic of electronic circuitry of a power converter 100 configured according to a flyback topology. Such flyback converter is formed by a transformer (Tr, 20) that has a primary winding 22 (with corresponding inductance L1 and N1 turns in the corresponding coil) on the primary side, and a secondary winding 24 (with corresponding inductance L2 and N2 turns in the corresponding coil); a primary or main switch (M1, 28) that is controlled by a control voltage signal (VcM1, 30) on the primary side. The flyback converter also includes a parasitic capacitance (Ceq, 32) that represents the total parasitic capacitance reflected across the primary switch and is disposed, on the primary side, between a terminal of the primary winding (L1, 22) and the ground. The source of the input voltage labelled as Vin or 38 is connected to another terminal of the primary winding.

The converter also includes a synchronous rectifier (SR, 34) on the secondary side that is controlled by a control voltage signal (VcSR, 25), and an output capacitor (Co, 36) disposed between the ground and a terminal of the secondary winding (L2, 24). The output voltage signal $V_O$ can be read across the capacitor $C_O$. In the following, any of the primary winding(s) and secondary winding(s) are discussed as possessing a corresponding inductance. The terms "main switch" and "primary switch" may be used interchangeably.

Figure 2:
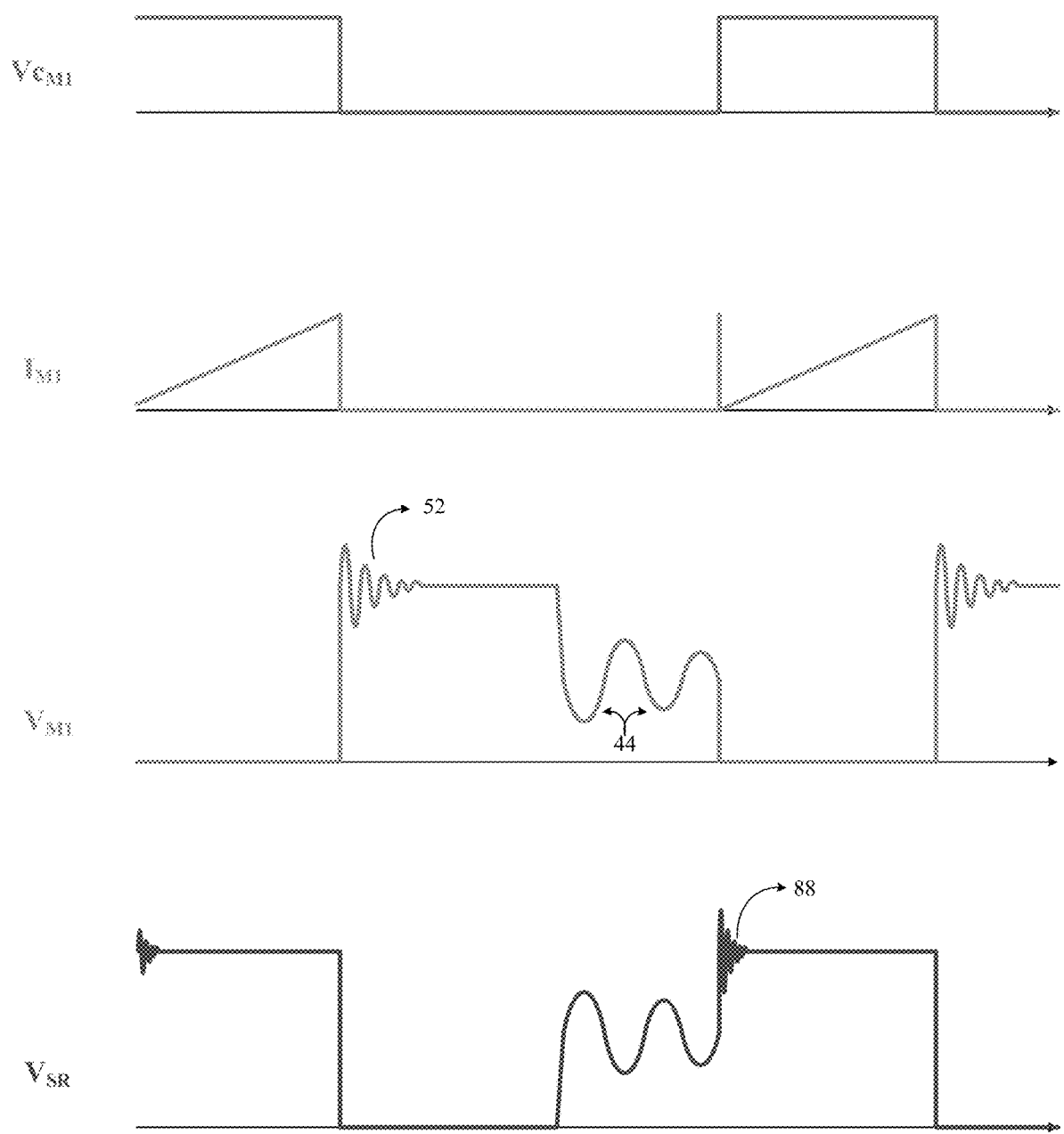
FIG. 2 illustrates the key waveforms of operation of a standard flyback converter.

FIG. 2 illustrates the plots representing the key waveforms of a flyback converter operating in discontinuous mode. These key waveforms include the control signal VcM1 for the main switch M1; the current $I_{M1}$ through the main switch; the voltage $V_M$ across the main switch; and the voltage $V_{SR}$ across the synchronous rectifier (SR, 34). During the operation of the circuitry 100 of FIG. 1, There exists first energy contained in the parasitic elements of the circuit (such as the leakage inductance, for example), which creates a ringing across the primary switch, shown as region 52 of the $V_{M1}$ signal in FIG. 2. In a conventional flyback topology, such first energy is dissipated as is the second energy contained in the ringing portion 44 of the $V_{M1}$ signal across the main switch during the dead time period t2-t3. The ringing portion 44 defines/contains the second energy at frequencies that are lower than frequencies corresponding to the ringing 52 and the first energy. In addition, there exists third energy contained in the parasitic capacitance (Ceq, 32) reflected across the primary switch 28. In most of the conventional flyback converters, such energy is also dissipated (and, therefore, lost), during the operation.

For example, in a conventional 65 W flyback converter, configured according to the schematic 100 and having a leakage inductance of 1.5 uH and operating at 150 kHz, the energy contained in the leakage inductance at full load is about 6.8 uJ.

The second energy, corresponding to the lower frequency ringing 44 across the main switch after the energy is fully delivered to the secondary side, is dependent on the input voltage 38 reflected in the primary side. For a parasitic capacitance Ceq of 260 pF, such second energy is about 4.8 uJ, and for an input voltage of 372 Vdc the second energy is about 11 uJ.

The energy contained in the parasitic capacitance Ceq across the primary switch is also function of the input voltage 38. For a parasitic capacitance of 260 pF and DC input voltage 38 of about 141 Vdc, the energy in Ceq is 2.58 uJ, while for a DC input voltage ($V_{in}$, 38) of about 373 Vdc the energy contained in Ceq is about 18 uJ. This energy is dissipated if the turning "on" of the main switch (M1, 28) is done in hard switch mode. In most of the flyback converters this energy is dissipated. For example at high input voltage of 373 Vdc and an operation frequency of 125 KHz, the total power dissipated in the parasitic elements is about 4.43 W, which represents 6.8% of the total processed power. In addition, in hard switching mode there exists a ringing across the synchronized rectifier 88 (as is depicted in FIG. 2 at the beginning of the time period t3-t4). The ringing across the synchronized rectifier 88 increases the noise, and negatively impacts the electromagnetic interference (EMI, as understood in the art) causing the requirement for snubbers and the use of a higher voltage synchronized rectification.

The following disclosure discusses solutions to existing problems persisting in the process of harvesting the energy from the leakage inductance.

Example 1: Flyback Converter with Active Clamp

Figure 3:
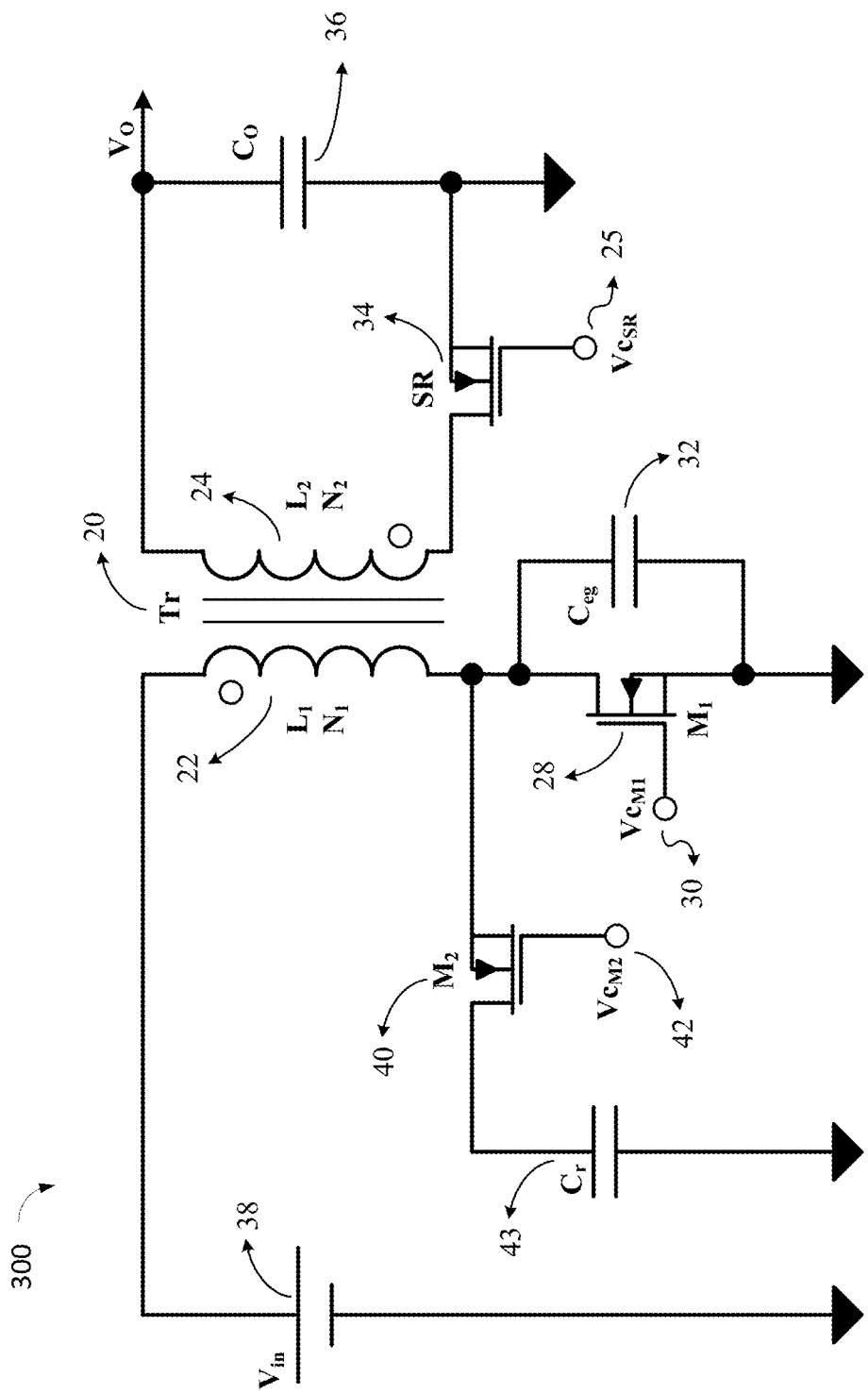
FIG. 3 schematically illustrates a flyback converter with an active clamp.

One attempt for harvesting the energy of the leakage inductance, provided in related art, was to use an active clamp, as discussed in 1993 in U.S. Pat. No. 5,434,768. FIG. 3 illustrates the attempt of U.S. Pat. No. 5,434,768 as applied to a flyback converter. Besides the general flyback circuitry 100 presented in FIG. 1, the circuitry 300 adds a clamp (or complementary) switch (M2, 40), controlled by a control voltage signal (VcM2, 42), as well as a clamp capacitor (Cr, 43), together comprising an active clamp designated as 310 and electrically connected between one terminal of the primary winding L1 and the ground.

Figure 4:
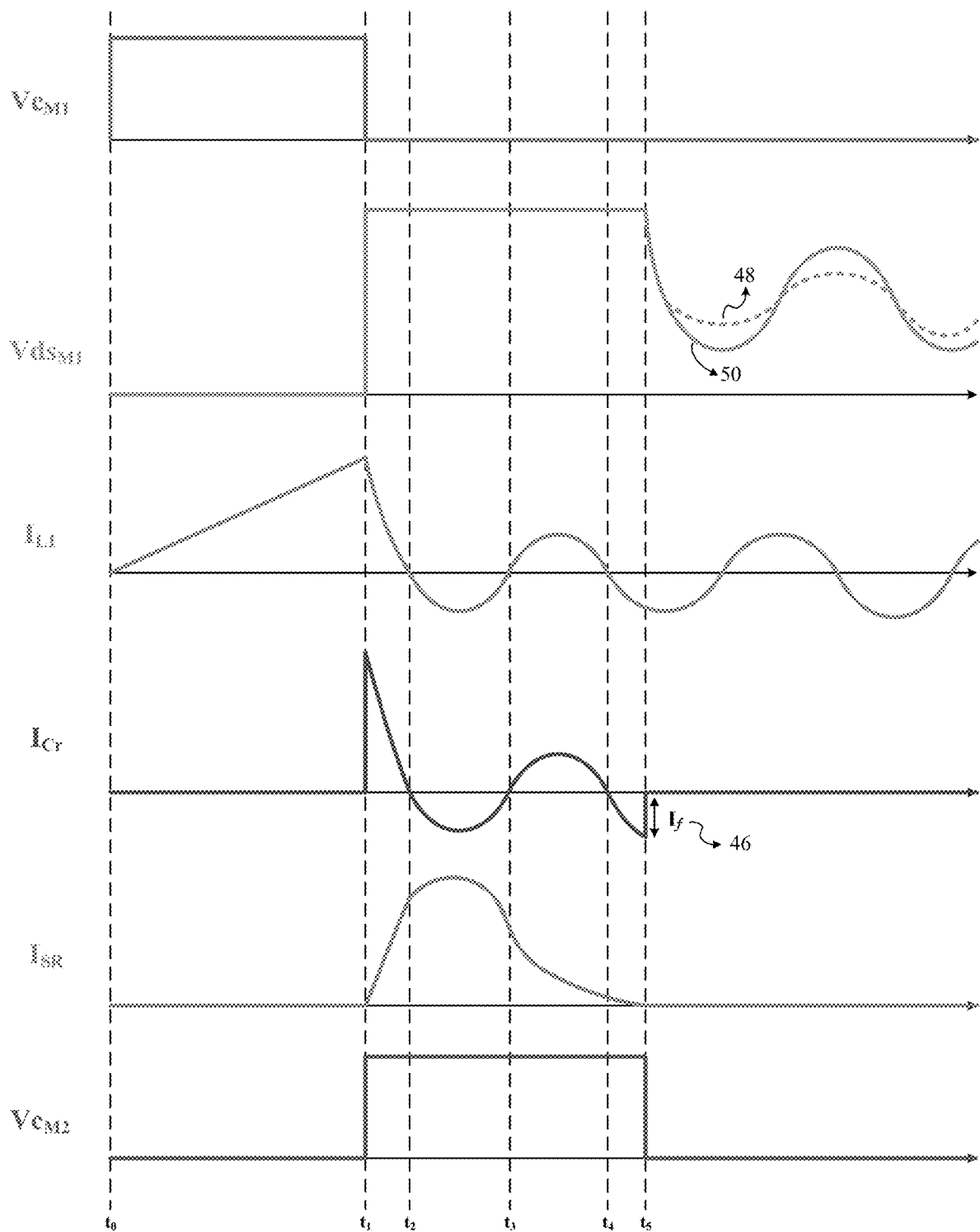
FIG. 4 shows plots representing the key waveforms of operation of a flyback converter with an active clamp.

The mode of operation of the active-clamp-containing flyback converter circuitry 300 is presented in FIG. 4, illustrating the key waveforms of the flyback circuit with the active clamp of FIG. 3. These waveforms include: 1) the control signal VcM1 (for the main switch M1); 2) the voltage across the main switch, VdcM1; the current $I_{L1}$ through the primary winding 22 of the transformer (Tr, 200; 3) the current $I_{Cr}$ through the clamp circuit; 4) the current $I_{SR}$ through the synchronized rectifier $I_{SR}$; and 5) the control voltage signal for the clamp (Mosfet, M2), VcM2.

Considering the time-line, between the moments t0 and t1, the main switch M1 is switched on, and the current $I_{L1}$ starts to build up through the magnetizing inductance, thereby storing energy in the transformer. At the moment t1, the primary switch turns off, and a result the magnetizing current starts flowing into the secondary winding. The leakage inductance reported to the primary side and the clamp capacitor form a resonant circuit. The current through the leakage inductance starts flowing through the clamp capacitor and the resonant circuit, formed by the leakage inductance, and the clamp capacitor shapes the current through the clamp circuit formed by M2 and Cr, accordingly. As can be seen from the schematic of FIG. 4, the current $I_{Cr}$ through Cr is characterized by ringing at the frequency(ies) determined by the resonant frequency between the leakage inductance and the clamp capacitor.

Initially, the $I_{Cr}$ current flows through the clamp capacitor Cr, decaying and substantially reaching a zero level at the moment t2. Between the time moments t2 and t3, the current through Cr becomes negative (which means that the current will be transferred to the secondary side, as depicted by the curve $I_{SR}$-representing the current through SR. Between the moments t3 and t4, the current $I_{Cr}$ through the clamp circuit turns positive again while reaching the zero level again at about t4. After t4, the current through the clamp circuit turns negative and, when the clamp switch M2 turns off at t5, the energy contained in the magnetizing current adds to the existing energy contained in the resonant circuit that is formed by the primary winding ($L_1$, 22) and the parasitic capacitance $C_{eq}$ reflected across the main switch. At the moment t5, the current through the clamp circuit is shown to have the negative amplitude (If, 46), and this current increases the amplitude of ringing during the dead time of the flyback converter (as shown in the curve $V_{dc}M1$) from 48 to 50. The number of ringing cycles or undulations, as well as the polarity of the current passing through Cr, is a function of time at which M2 is switched "on" and the resonant frequency formed by leakage inductance and the clamp capacitor Cr. Accordingly, the number of such undulations and/or polarity of the current through Cr may vary. The clamp circuit (formed by M2 and Cr) takes the leakage inductance energy initially by charging the clamp capacitor Cr and further some of the energy is transferred to the secondary side while some of the energy is bounced back (to the primary side) and forth before the active clamp switch turns off. At the moment t5, when the clamp switch turns off, the energy remained in the magnetizing inductance adds up to the energy contained in the resonant circuit formed by the inductance of the primary winding and the parasitic capacitance, Ceq, 32, reflected across the main switch (M1, 28).

In some applications of the related art, the negative current (If, 46) passing through the clamp capacitor at the time t5, when the clamp switch turns off, is tailored to add to the energy in the resonant circuit formed by the inductance of the primary winding of the transformer and the parasite capacitance Ceq, in order to increase the ringing amplitude and—by using the valley detection approach to turn on the main switch at a lower voltage level (or even at a zero voltage level) if the flyback operates in critical conduction. (A person of skill in the art will readily appreciate that the approach that is known as "valley detection" includes identification of the valley(s) or the portion(s) of the curve VdcM1 around the local minimum(s) of the ringing after the moment t5 and turning the main switch "on" at the moments corresponding to these valley(s) to reduce the main switch losses)-

This way, some of the energy from the leakage inductance is used to decrease the switching losses or even eliminate them if the flyback operates in critical conduction mode, where the main switch M1 turns on at the first "valley" (or minimum) of the ringing portion of the signal.

As was already alluded to above, the leakage inductance energy is typically lost in conventionally-configured circuitry.

Example 2: Partial Time Active Clamp Flyback

Figure 5:
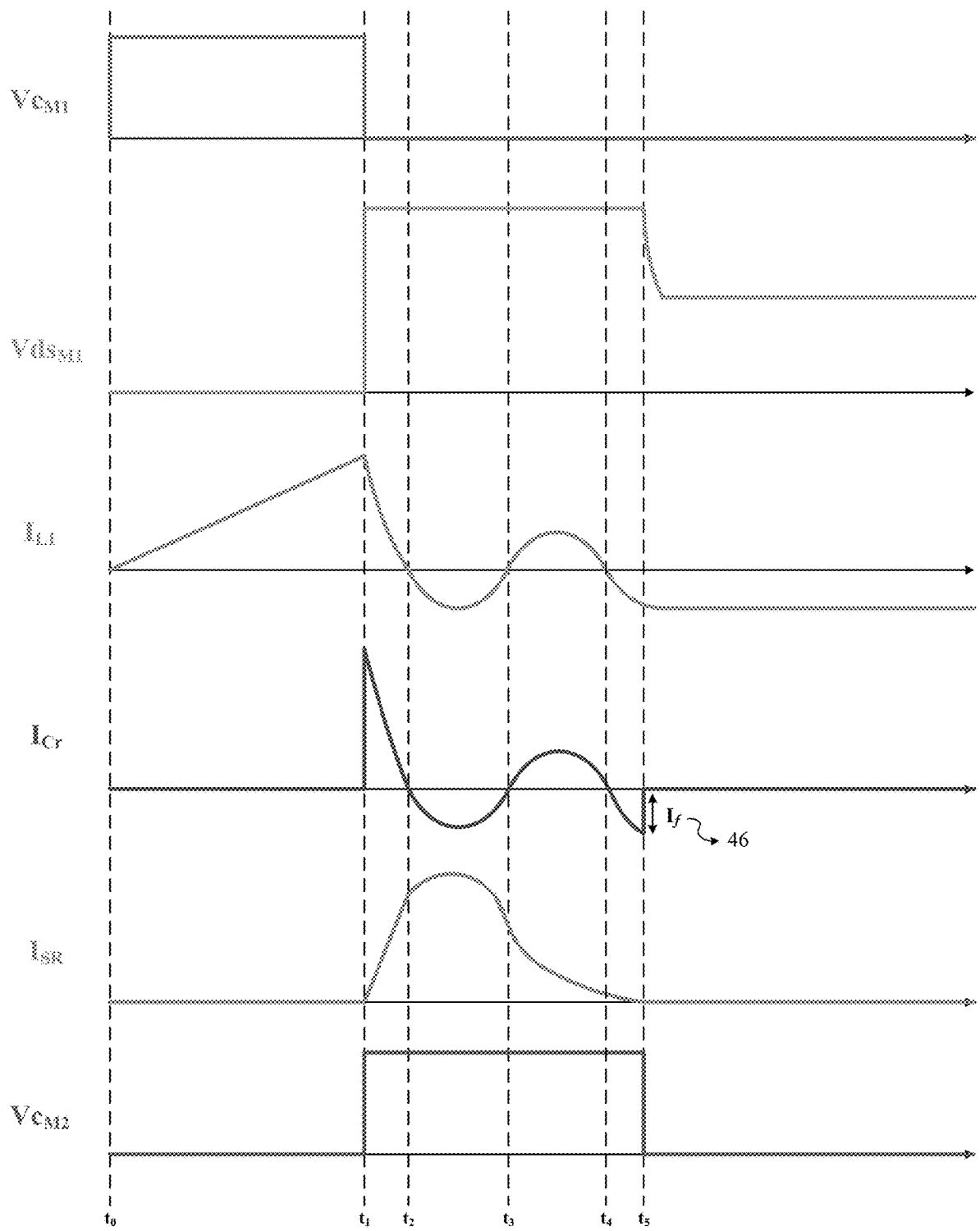
FIG. 5 shows the key waveforms of operation of a flyback converter with an active clamp.

One concept of harvesting some of the leakage inductance energy for obtaining zero voltage switching conditions for the main switch M1 has been addressed U.S. patent application Ser. No. 14/933,476 titled "Partial time active clamp flyback", the disclosure of which is incorporated herein by reference. The waveforms depicted in FIG. 5 reflect the concept presented in U.S. Ser. No. 14/933,476. The energy contained in the magnetizing current at the moment t5, when the active clamp switch turns off, is added to the energy of the magnetizing inductance (which is harvesting the energy of the resonant circuit formed by the inductance of the primary winding and the parasitic capacitance Ceq). According to this concept, the energy associated with the negative value (If, 46) of current $I_{C_r}$ at t5 is stored and later utilized before the turn on of the main switch, to lower the voltage across the main switch M1 and to reduce the switching losses.

Figure 6:
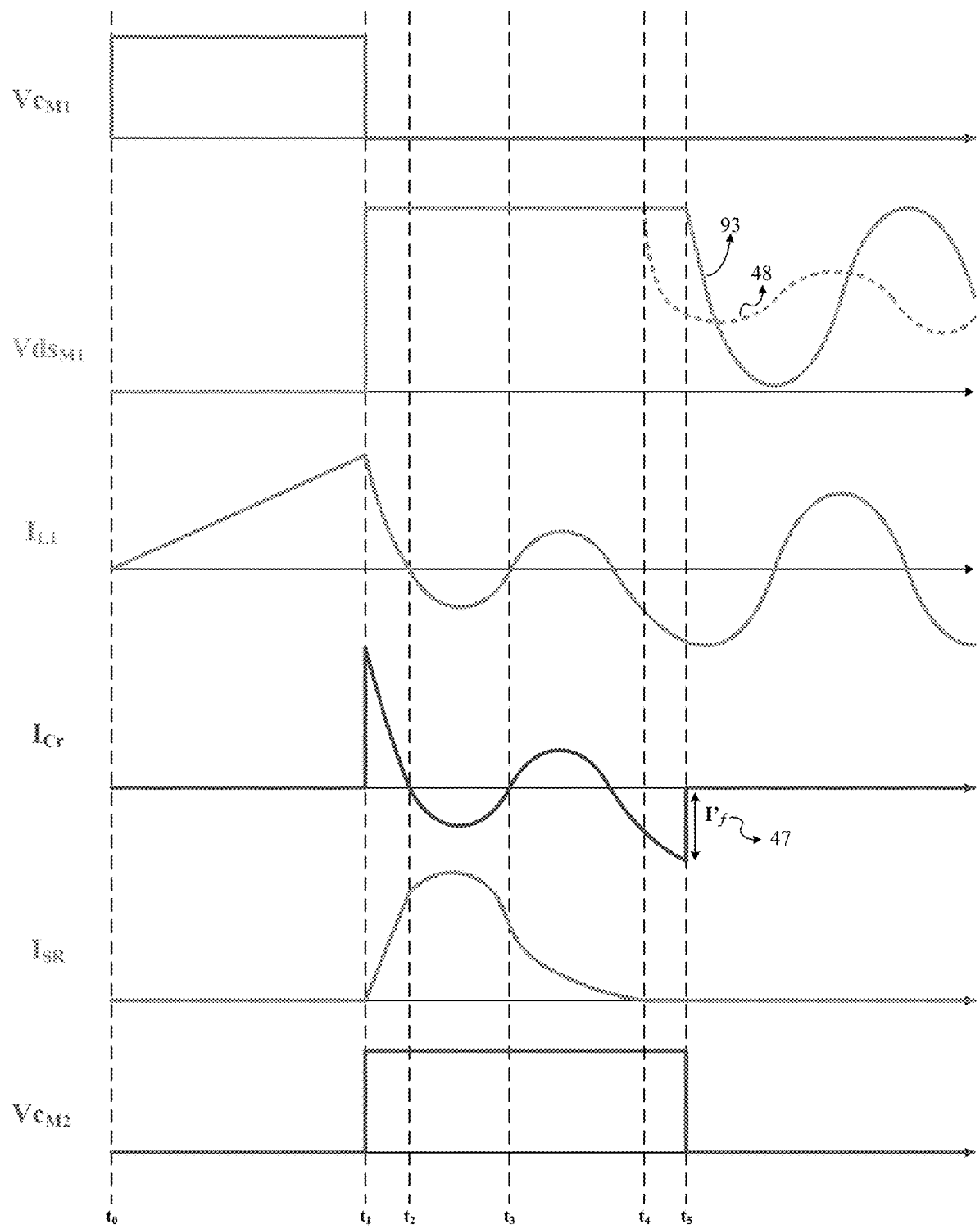
FIG. 6 shows the key waveforms of operation of the flyback topology with an active clamp, where the clamp circuit is controlled to increase the energy injection into the resonant circuit formed by the primary inductance of the transformer and the parasitic capacitance reflected across the primary switch.

FIG. 6 presents the plots illustrating that the "on" time for the clamp circuit is extended after the current through the synchronized rectifier reaches a zero level at t4 (see labels 48, 93). Here, the negative current through the clamp capacitor Cr is increasing in amplitude during the time-period between t4 and t5, and reaching the value (If, 47) at the moment t5. (Notably, the implementation of the technological approach described in the patent application Ser. No. 14/933,476 can further add to the energy in the magnetizing inductance, and zero voltage switching for the main switch M1 can be accomplished.)

According to the method of operation, of the flyback power converter-based circuitry, that is configured per the implementation depicted in FIG. 6, the clamp control signal (VcM2, 42) has the extended "on" time (a period from t4 to t5, as shown) in order to increase the amplitude of the current (I', 47) at the moment t5 and inject energy carried by such increased-amplitude current into the natural ringing, causing the increase of the amplitude of such ringing from that corresponding to the portion 48 (of curve VdsM1) to that corresponding to the portion 93 (of curve VdsM1). (As discussed further in reference to FIGS. 10, 11, in a related embodiment of the invention, the current through the clamp circuit formed by (M2, 40) and (Cr, 43), is zero at the time when the current $I_{C_r}$ through (SR, 34) reaches zero.)

In the event the flyback converter operates in critical mode (namely, a mode in which the mains switch turns "on" during the time of the first valley of the VdsM1 signal, the voltage on the first valley can be zero, creating zero voltage switching condition for the main switch M1. If the flyback converter, on the other hand, operates in a conventional mode, the additional energy injection from If will increase the amplitude of the ringing—as depicted by the curve VdsM1 of FIG. 6, where both the initial ringing portion 48 and the increased-in-amplitude ringing portion of the curve are shown as 48 and 93, respectively.

The drawback of the approach of U.S. Ser. No. 14/933,476 is that the leakage inductance energy circulating through the clamp is increasing, which in turn increases the conduction losses, and that the additional energy injection in the resonant circuit (formed by the inductance of the primary winding of the transformer and the parasitic capacitance Ceq) is partially dissipated due to the increased AC-impedance of the transformer winding at the frequency of the ringing.

As follows from the above discussions of various circuits, the energy form the leakage inductance is circulating through the clamp circuit and that circulation increases the conduction losses through the clamp switch M2. In the case wherein the "on" time of the clamp switch is extended (as depicted in FIG. 6), the energy in the clamp circuit is further increased and that occurrence increases the conduction losses in M2, with the benefit of increasing the energy contained in the magnetizing inductance at the end of the clamp switch M2 period of conduction. In some application wherein the flyback operates in critical conduction zero voltage switching can be accomplished.

Example 3

In contradistinction with the related art, one idea of the present invention is implemented to avoid injecting any energy into the magnetizing inductance to avoid additional circulating current in the converter, and stems from the realization that the minimization of the current circulating through the clamp circuit formed by M2 and Cr (and, therefore, the minimization of the circulating through the clamp circuit energy from the leakage inductance) involved reducing the current through the clamp capacitor to zero at the time when the SR at the secondary side turns "off".

Figure 7:
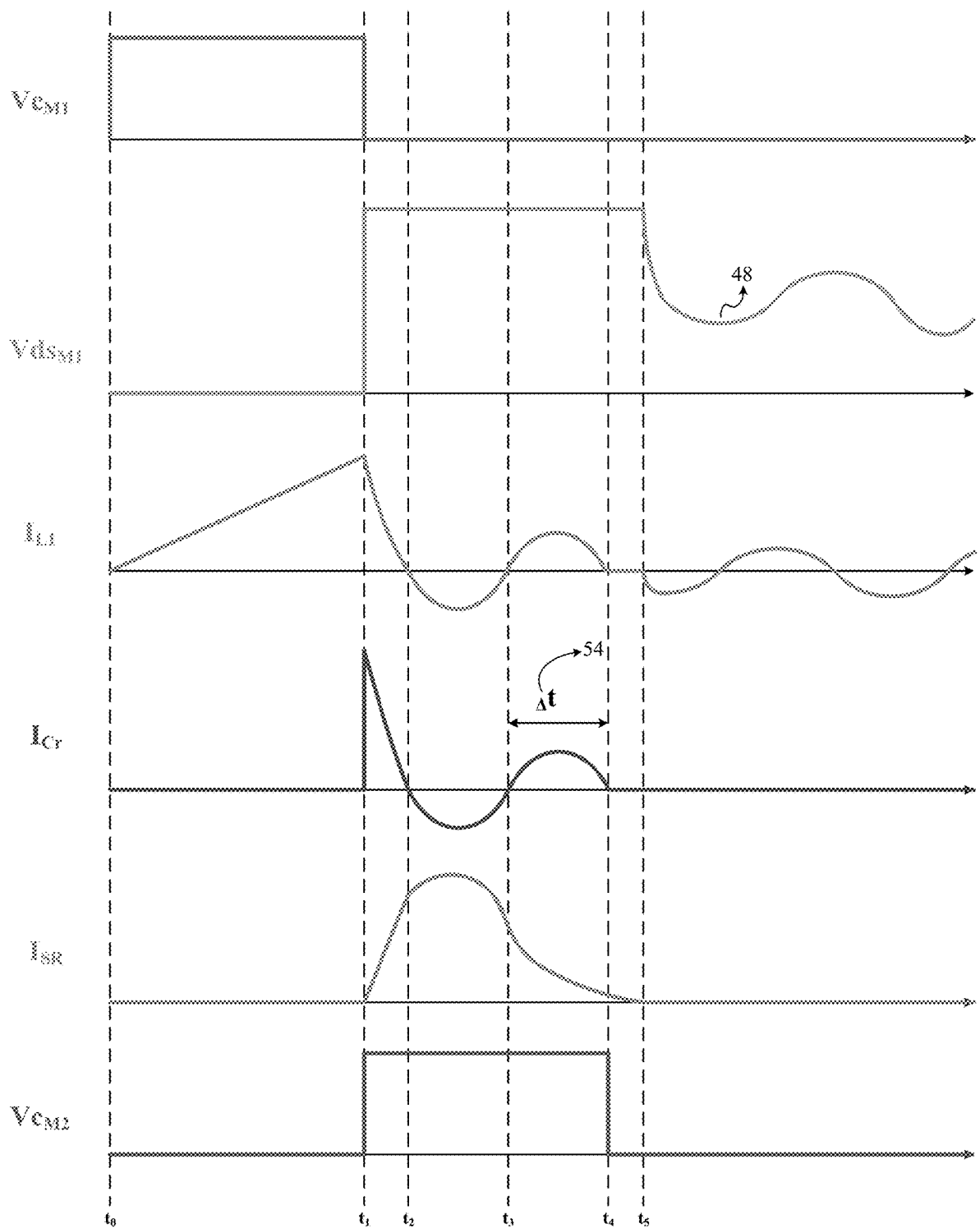
FIG. 7 illustrates the key waveforms of operation of an embodiment including the flyback topology with an active clamp where the clamp switch is turned off prior to the moment when the current passing through the secondary winding reaches zero, and where the current passing through the clamp circuit is zero when the clamp is turned off.

In this embodiment, the operation of which is discussed in reference to FIG. 7, the energy transferred from the clamp circuit portion (of the overall flyback-converter-with-an-active-clamp circuitry 300 of FIG. 3) to the secondary side is caused to end before the moment of time when the current through the synchronized rectifier at the secondary side reaches zero. Here, there is no additional energy injection into the magnetizing inductance after the current through the synchronized rectification reaches zero. The energy contained in the leakage inductance is fully delivered to the secondary side and there is no further energy transferred to the magnetizing inductance when the clamp circuit turns off.

In this mode of operation, as is schematically depicted in FIG. 7, the clamp switch M2 is turned "off" substantially at any time between the moments t3 and t4 when the current through the clamp circuit is positive (flowing from the clamp capacitor Cr towards the secondary side). As shown in FIG. 7, the clamp switch M2 is turned "off" at the moment t4. The current through the synchronized rectifier (SR, 34) continues to flow until t5, as shown. Because there is no energy transferred to the magnetizing inductance after the moment t5, the amplitude of the ringing portion 48 of the VdcM1 waveform is necessarily reduced as compared with the previous case. In this embodiment, therefore, the energy circulating through the clamp circuit formed by M2 and Cr is minimized, thereby reducing the conduction losses and increasing the efficiency of the overall circuitry.

Overall, in this embodiment the leakage inductance energy is transferred to the secondary side and does not bounce back and forth through the clamp, and there is no energy left in the clamp at the time the clamp switch (M2, 40) turns off.

Example 4

Figure 8:
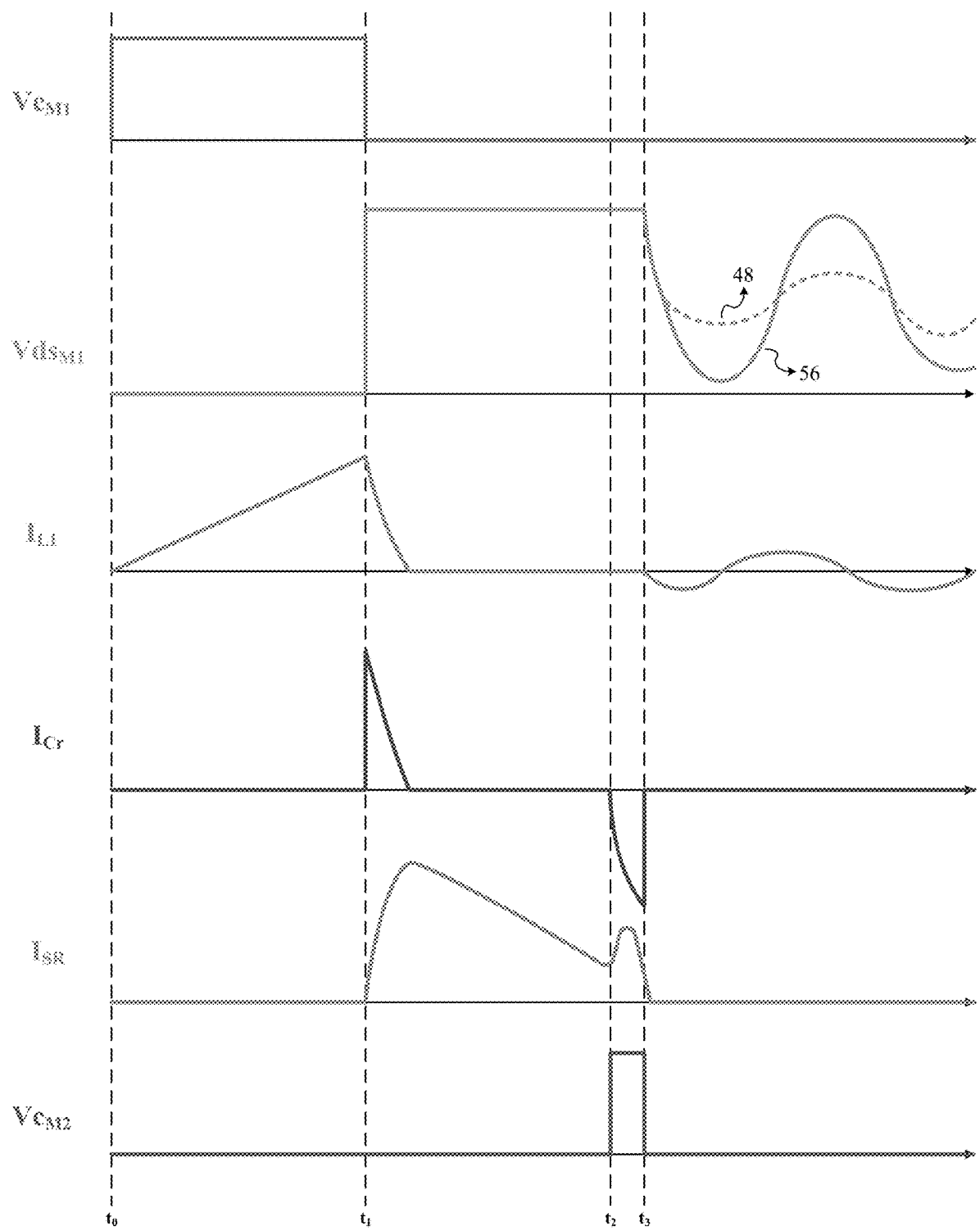
FIG. 8 presents the key waveforms of operation of the flyback topology with an active clamp where the clamp switch is turned on for a predetermined period of time prior the moment when the current in the secondary winding reaches zero.

A related embodiment of a method for recycling the leakage inductance energy from the flyback converter electronic circuit of FIG. 3 is now described in reference to FIG. 8. In FIG. 8, the clamp switch M2 is turned on between the moments of time t2 to t3 9 as shown—at t2). Initially, the leakage inductance energy is then transferred to the (Cr, 43) through the body of the switch M2. The clamp switch M2 is turned on at t2 for a pre-determined period of time before the current $I_{SR}$ through the SR reaches zero. The conservation of charge in the clamp capacitor Cr requires that the charge transferred to Cr be extracted and that extraction will occur between t2 and t3. During that time interval, the current through the active clamp portion of the overall circuitry becomes negative (changes the direction of flow) and energy is transferred to the secondary side.

The negative current $I_{Cr}$ through the clamp capacitor increases the energy in the magnetizing inductance and, as a result, that energy is further added to the energy already contained in the resonant circuit formed by the primary winding L1 and the parasitic capacitance Ceq across the main switch. As a result, the ringing across the main switch during the dead time period (t2 to t3) is increasing, as shown by a change of the portion of the plot representing the ringing portion, in the curve VcM1, from 48 to 56. (Here, the portion 48 represents the voltage across the main switch M1 without additional energy injection form the clamp, and the portion 56 represents the voltage across the main switch with the energy injection form the clamp circuit.)

Example 5

Figure 9:
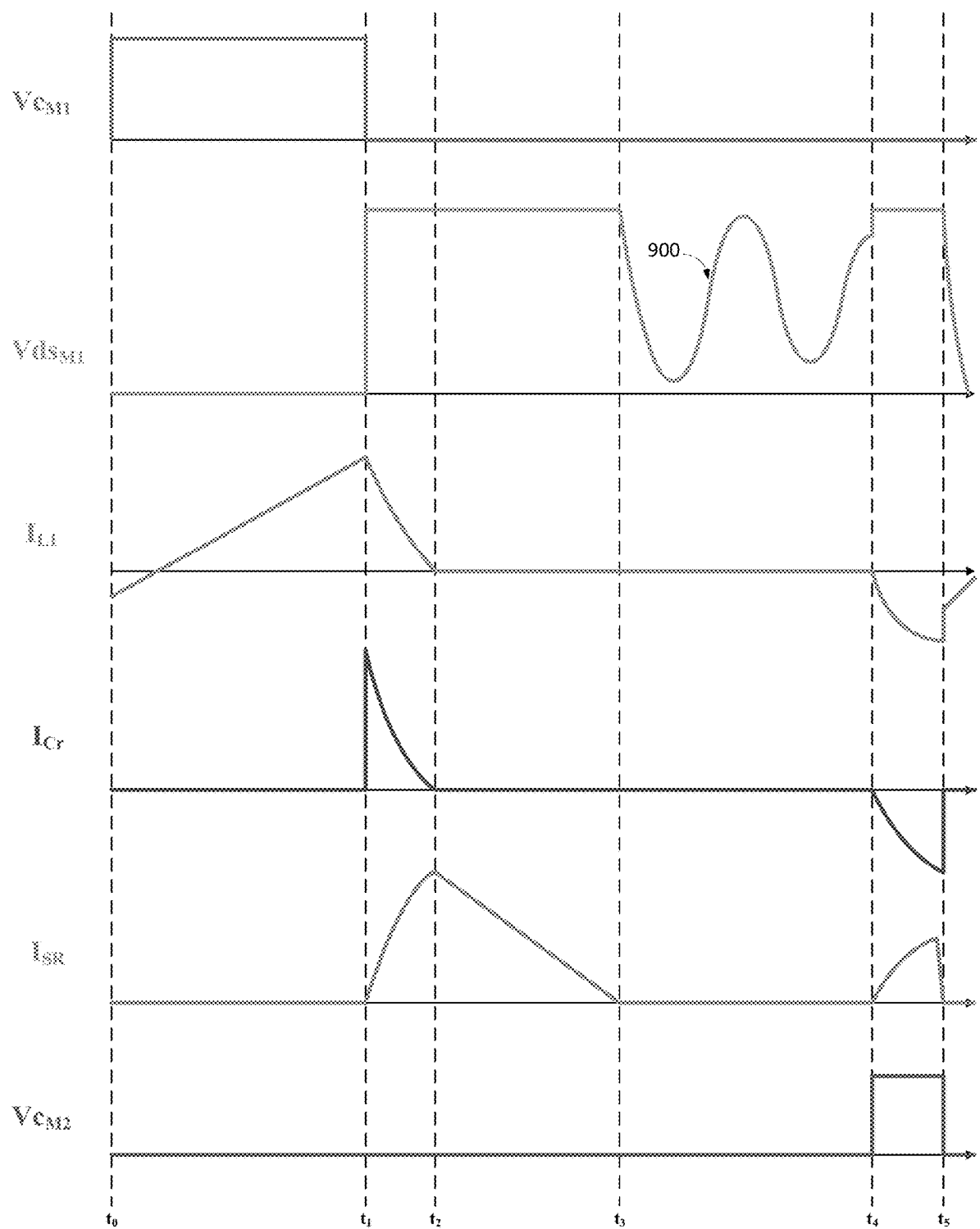

Yet another embodiment of the method for recycling the leakage inductance energy in the circuitry configured according to FIG. 3 is described in reference to FIG. 9.

Here, the clamp switch (M2,40) is intentionally not activated during the period of time when the synchronized rectifier (SR, 34) is conducting. The leakage inductance energy is allowed to be fully transferred to (Cr, 43) after the main switch (M1, 28) turns off at t1. After the current $I_{SR}$ through SR reaches zero, the dead time period (t3 . . . t4) starts, where there exists a low frequency ringing (910, see curve VdcM1) across the main switch (M1,28), caused by the resonant circuit formed by the parasitic capacitance reflected across the main switch, (Ceq, 32), and the inductance of the primary winding (L1, 22). Before the primary switch turns on again, the clamp switch M2 is caused to turn on at t4 for a predetermined period of time (as shown—between t4 and t5). During this time period, the energy transferred to the Cr between t1 and t2 is extracted (removed, taken) out of Cr and further transferred to the secondary through SR. Some of the energy transferred to the Cr during the period (t1 . . . t2) will discharge the parasitic capacitance Ceq. To soften the transition from the voltage level during the dead time to the voltage level of (Vin+nVo), where n is the ratio of a number of turns or coils in the primary winding to that in the secondary winding, the turn "on" of the switch M2 should be preferably carried out at the moment corresponding to the peak of the low frequency ringing 910. Unlike in the case of utilizing the valley detection methodology (where the main switch is turned "on" at the valley or minimum of the ringing portion of the signal), with the use of the present embodiment the turn on of the clamp switch M2 is effectuated at the peak of the ringing portion.

Example 6: Recovery of Energy from Leakage Inductance

Figure 10:
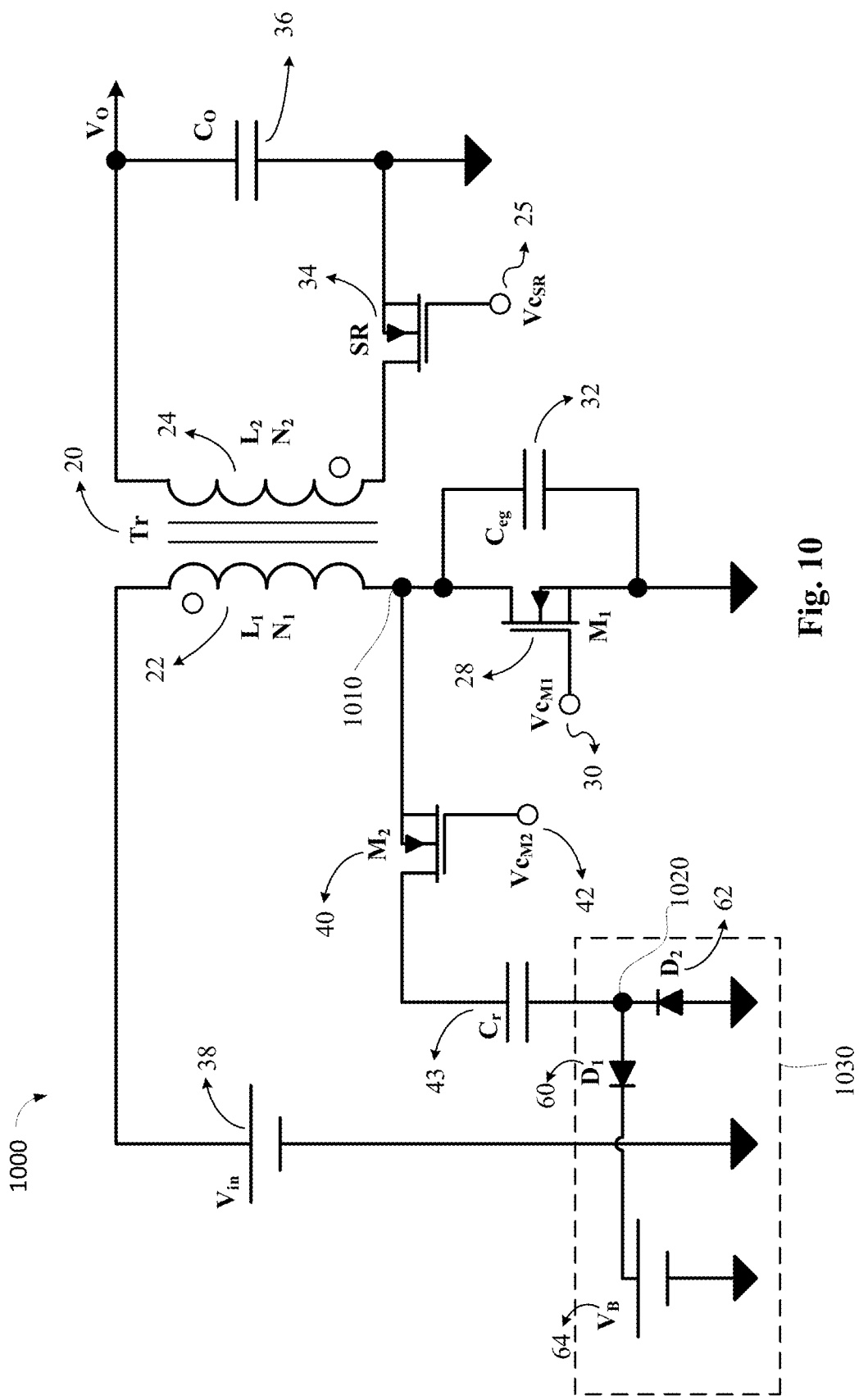
FIG. 10 schematically illustrates an embodiment including a flyback topology with an active clamp, configured to harvest the energy of the leakage inductance (for example, in order to power the bias of the converter and to have extra energy transferred to the secondary side, as discussed below). Here, an additional circuit formed by two rectifiers (shown as diodes D1, D2 in this example) and a voltage source Vb is placed in series with the clamp circuit.
Figure 11:
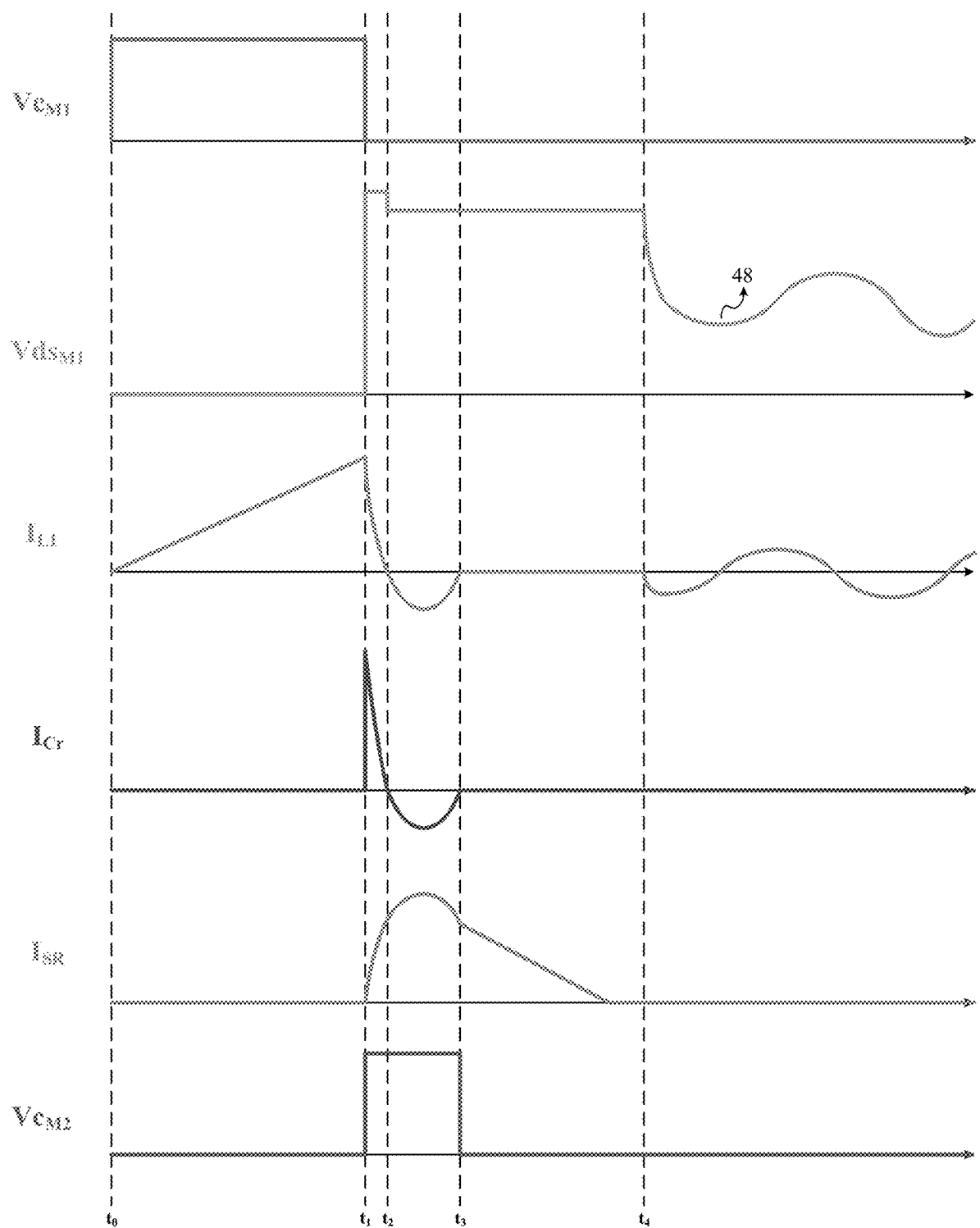
FIG. 11 illustrates the key waveforms of an embodiment including the flyback topology with an active clamp, incorporating the current-shaping and the energy-recovery circuit of FIG. 10.

Another implementation of the idea of the invention is now discussed in reference to FIGS. 10, 11. Here, a problem of wasting electromagnetic energy, EM (of leakage inductance of the flyback with active clamp circuitry) contained in a ringing portion of the clamp circuitry waveform and circulating through the clamp circuitry is addressed by complementing the flyback-with-active-clamp circuit with an auxiliary electronic system or component configured to store of EM energy (such as, in one embodiment, an auxiliary source of voltage) and charging such auxiliary system or component with this (otherwise wasted by related art) energy through an electronic valve attached to the clamp circuit. The act of so-charging the auxiliary EM storage system is carried out to reduce the rms current passing through the clamp portion of the overall circuitry and, therefore, reduction of the ringing.

One example of the corresponding embodiment 1000 is containing the flyback converter with an active clamp (already referred to in FIG. 3) with modifications configured to implement the idea of the invention.

As shown, the primary side of the overall circuitry 1000 includes the primary winding L1 of the transformer (Tr, 20), having N1 turns in its primary winding. One terminal of the primary winding L1 is directly connected to the source of the DC input voltage (Vin, 38) and another terminal of 11—shown as the node 1010—is connected with the active clamp formed by the complementary switch (M2, 40) and the clamp capacitor Cr. The clamp switch is controlled by the source of a control voltage signal (VcM2, 42). The remaining portion of the primary side of the flyback converter with the active clamp circuitry has been already discussed in reference to FIG. 3.

The secondary side of the overall circuitry 1000 includes the secondary winding L2 of the transformer (Tr, 20) that has $N_2$ turns in its secondary winding; the synchronous rectifier (SR, 34); and the remaining electronic elements that have been already discussed in reference to FIG. 3.

As shown, in series with the clamp capacitor (Cr, 43) are placed two rectifiers (rectifier means, in this example depicted as diodes). The first rectifier (D1, 60) has its anode connected to the clamp capacitor (Cr, 43), at the node 1020 The second rectifier (D2, 62) has its anode electrically connected to the input ground and its cathode—to the clamp capacitor (Cr, 43), at the node 1020. An energy storage (shown here as the voltage source (Vb,64)) is further added between the ground and the cathode of the first rectifier. This electronic-circuitry addition to the active-clamp portion of the circuit 1000 is designated as 1030.

The key waveforms representing the operation of the circuit 1000 are schematically depicted in FIG. 11. The key waveforms include: a) the control signal (VcM1, 30) of the main switch M1; b) the voltage (VdsM1) across the main switch M1; c) the current $I_{L1}$ through the primary winding L1 of the transformer (Tr, 20); d) the current $I_{Cr}$ through the clamp capacitor Cr; e) the current $I_{SR}$ through the synchronous rectifier (SR, 34); and f) the control signal VcM2 for the clamp switch M2.

Referring further to FIG. 11, in operation of the circuitry 1000, in the time period between to and t1, the main switch M1 is configured to conduct and the magnetizing current builds up in the transformer Tr. At the moment t1, the main switch M1 turns off (shown as VcM1 reaching zero) and the magnetizing current starts flowing towards the secondary winding (L2, 24) and through the synchronous rectifier (SR, 34). The current flowing through the leakage inductance of the primary side starts flowing through the clamp circuit formed by (M2, 40) and the clamp capacitor (Cr, 43), and then through the first rectifier (D1, 60) towards the auxiliary energy storage (Vb, 64). Unlike in the previous examples of circuits discussed above—and in contradistinction with such examples—the current from the leakage inductance here is directed towards the voltage source Vb. This directionality completely changes the mode(s) of operation of the clamp circuit with which a skilled artisan may be familiar: a simple comparison of the shape of the plot $I_{Cr}$ representing the current passing through the clamp capacitor (Cr, 43) in case of the embodiment discussed in reference to FIG. 7, for example, with that of FIG. 11 immediately illustrates the advantageous nature of operation of the embodiment 1000. The ringing portion, associated with the resonance between the leakage inductance and the clamp capacitor (see time period from t3 to t4) substantially disappears and the time interval (between t1 to t2), during which the current through the clamp capacitor reaches the zero level, substantially shortens. As a result, the charge injected into the clamp capacitor Cr (and substantially corresponding to the area under the $I_{Cr}$ curve between the moments t1 and t2) is significantly decreased in the case of operation of the circuitry 1000 as compared to that of the circuitry the operation of which is described in FIG. 7. As a result, the electrical charge that has to be extracted from the clamp capacitor in the time period (between the moments t2 and t3) is decreased as well. Injecting (delivering) the current through D1 into a voltage source (auxiliary storage of EM energy) $V_B$ causes the transfer of energy to the voltage source Vb and produces a dumping effect, substantially reducing the ringing in the active clamp portion of the circuitry. In this embodiment, all of the leakage inductance energy is transferred to the voltage source (Vb, 64). The time interval between t1 and t2 is a function of the voltage across Vb. For a larger value of Vb, the time interval between t1 to t2 decreases, comparatively. The voltage across Vb is reflected across the voltage across the main switch, as depicted in the VdsM1 of FIG. 11 (an "overshoot" portion of the curve, characteristically not present in corresponding curves of either of FIGS. 4, 5, 6, 7, 8, and 9). The reduction of the duration of the time interval (t1 . . . t2) leads to a considerable decrease of the RMS current through clamp circuit formed by (M2,40) and (Cr,43).

For example, in a conventional 65 W flyback converter having a leakage inductance of 1 micro-H and a clamp capacitor of 100 nF, the RMS current $I_{Cr}$ through the clamp circuit is about 0.313 A if and when the concept of operation depicted in FIG. 7 is used. However—and in advantageous comparison—if and when the flyback converter is equipped with the additional storage circuitry 1030 and the principle of operation illustrated in FIG. 11 is carried out, for a Vb=10 V, the RMS current $I_{Cr}$ through the clamp circuit is decreased to about 0.185 A (that is, by at least 0.128 A or by at least 40%). With that, the power dissipated in conduction in M2 (which is proportionate to the square of the RMS current) is reduced by about 5.98 times.

In the case of somewhat higher leakage inductance (such as, for example, 4 micro-H) the advantageous impact of the usage of the circuitry portion 1030 it is even stronger. Specifically, with the use of the principle of operation described in FIG. 7, the RMS current through the clamp circuit would be about 0.527 A. However, if the hardware of FIG. 10 is used operated according to the principles of FIG. 11, then for a Vb of about 10 V the RMS current through the clamp circuit is reduced to about 0.249 A (that is, by about 52%)

In addition or alternatively, and further comparing the results of operation depicted in FIG. 7 with those depicted in FIG. 11 (for the embodiment 100 of FIG. 10), the time interval measured between the moment t1 and the moment t2 in FIG. 7 is about 1.12 micro-s. For the circuitry 1000, on the other hand, the time interval (t1 to t2) is reduced to about 0.644 micro-s for VB of 10 V.

It is appreciated, therefore, that the circuit 1030 is judiciously configured to improve the operation of the flyback converter with an active clamp by substantially reducing the RMS current passing through the clamp capacitor.

The person of ordinary skill in the art will readily appreciate that one advantage of the use of the topology depicted as a circuit 1000 in FIG. 10 (in reference to the corresponding key waveforms of FIG. 11) is that the energy circulating through the active clamp is significantly reduced as compared to operation of another implementation of the flyback converter with an active clamp. Another advantageous feature is that part of the leakage inductance energy—otherwise substantially wasted and lost in circuits of related art—is practically stored and, therefore, can then be utilized. (For example in the last numerical example where the leakage inductance was 4 micro-H, an average current of 46 mA was injected into the Vb. If VB is configured as a source of bias voltage, then the power of about 460 mW was injected into the bias and can be used despite the fact that such amount of power may be higher than the power consumption of the bias).

In operation, the proposed technical methodology increases the efficiency of the converter through the reduction of (by reducing) the current circulating through the active clamp and by utilizing the energy of the leakage inductance. The higher the amplitude of the auxiliary voltage source, Vb, with which the clamp portion of the circuitry is equipped, the smaller the current circulating through the clamp portion of the overall circuit. Alternatively or in addition, because the time interval (t1 to t2) is reduced as compared with other related circuits, more of the energy from the leakage inductance is transferred to the secondary side, thereby shaping the current through the synchronized rectifier SR accordingly.

Figure 12:
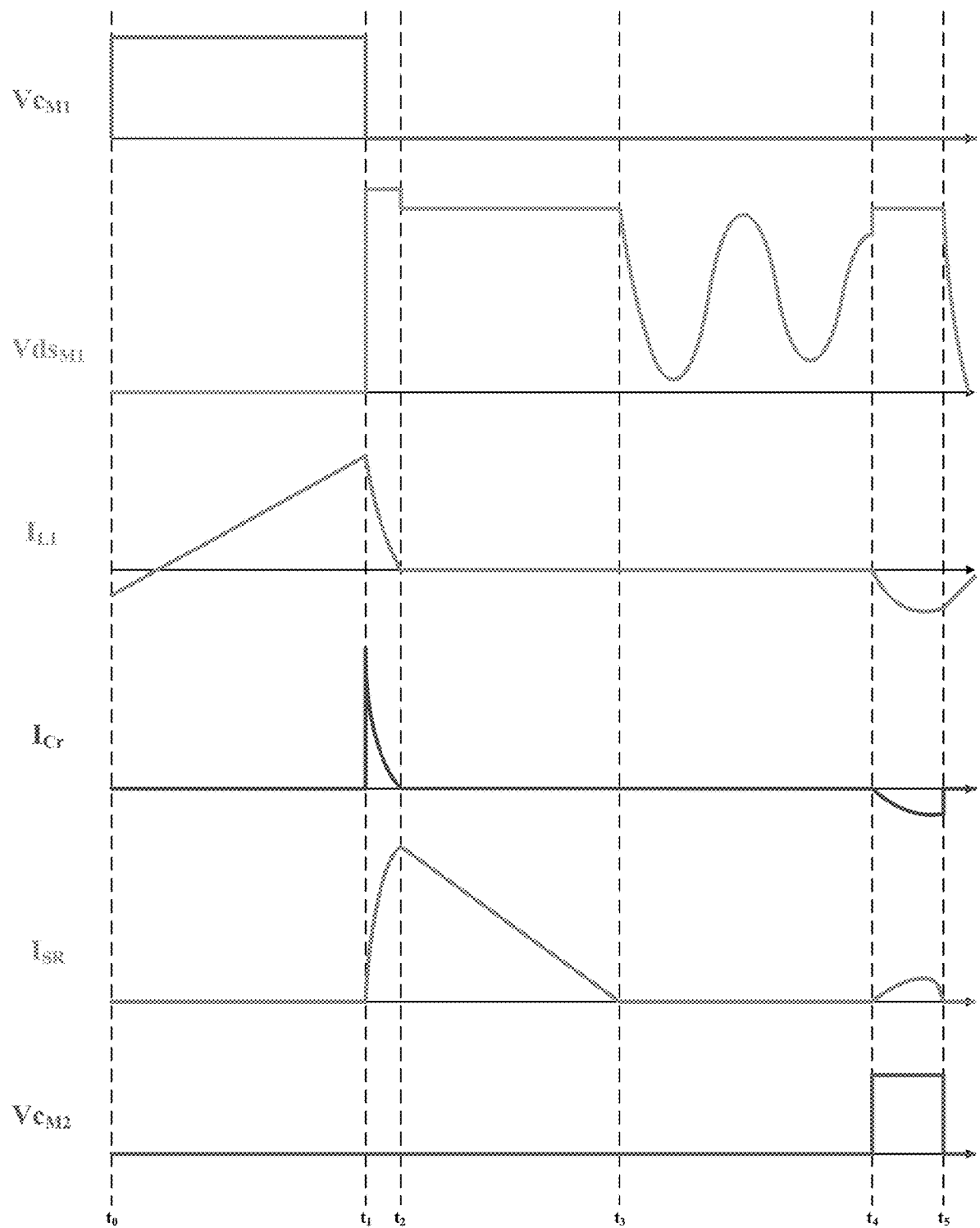
FIG. 12 depicts the key waveforms of the flyback topology with an active clamp incorporating the current-shaping and the energy-recovery circuit of FIG. 10 as applied to the circuit the operation of which is depicted in FIG. 9.

The hardware and principle of operation illustrated in reference to FIGS. 10, 11 can also be used in combination with other circuits—such as the one the operation of which is presented in FIG. 9, for example Comparing the key waveforms from FIG. 9 and FIG. 12, it can be noticed that the time interval t1 to t2 has been reduced, and even the amplitude of the current $I_{Cr}$ in the time interval (t4 to t5) has been reduced. These effects take place is due to the fact that if a smaller charge is stored in the clamp capacitor Cr, then the smaller charge has to be taken out during the period (t4 to t5).

It is appreciated, therefore, that embodiments of the invention provide an electronic circuitry having primary and secondary sides and including (a) a flyback power converter containing an input voltage source; a transformer having primary and secondary windings, on the primary and secondary sides, respectively; a main switch in series with the primary winding on the primary side; and a synchronous rectifier in series with the secondary winding on the secondary side, and (b) an active clamp circuit across the main switch, the active clamp circuit containing a clamp switch and the clamp capacitor in series with the clamp switch. Here, the clamp switch is configured to be turned on at a moment of time after the main switch is turned off; and the clamp switch is configured to be turned off at a moment of time prior to the moment of time at which current passing through the secondary winding reaches a zero level. The electronic circuitry is characterized by a first value of rms current through the clamp capacitor. IN one embodiment, such electronic circuitry is further equipped with an auxiliary circuit that contains two additional rectifiers connected in parallel with one another and in series with an electronic component configured to store electromagnetic energy. Here, a cathode of a first of the two additional rectifiers is directly electrically connected with a cathode of the active clamp circuit; an anode of a second of the two additional rectifiers is directly electrically connected with the cathode of the first of the two additional rectifiers; a cathode of the second of the two additional rectifiers is directly electrically connected with a first terminal of the electronic component; and a second terminal of said electronic component is electrically connected with an anode of the second of the two additional rectifiers. Such auxiliary circuit is configured to reduce the rms current through the clamp capacitor from the first value to a second value, the second value being at least 40% lower than the first value. In at least one implementation, the electronic component is configured as a voltage source (in this case, the first terminal is a positive terminal of said voltage source and the second terminal is a negative terminal of said voltage source). In any implementation where the electronic component is configured as a voltage source, such voltage source may be configured to provide bias voltage to the flyback power converter. An implementation, in which the electronic component is configured as a voltage source configured to provide bias voltage to the flyback power converter, may additionally include a controlled switch placed in parallel with said first of the two additional rectifiers and configured to be turned "on" and "off" to maintain such bias voltage at a substantially constant level. In some implementations, the primary side additionally includes a driving winding, a first terminal of the driving winding being directly connected to a terminal of the primary winding, the second terminal of the driving winding being directly connected to a differential electronic circuitry (here, the differential electronic circuitry is configured to generate a control voltage signal to the clamp switch to drive the active clamp circuit). Any implementation in which the electronic component is configured as a voltage source that is a source of bias voltage of the flyback power converter, such source of bias voltage may include (i) a bias winding at the secondary side of the transformer, the bias winding being coupled with the primary winding and the driving winding of the primary side of the transformer; (ii) a bias synchronous rectifier connected to a first terminal of the bias winding; and (iii) a bias capacitor connected to a second terminal of the bias winding at a node that is grounded. Notably, the source of bias voltage may be configured to generate a bias voltage that is substantially proportional to an output voltage of the electronic circuitry measured between a terminal of the secondary winding and the ground.

Embodiments additionally provide a method for operation of the electronic circuitry having primary and secondary sides and comprising (i) a flyback power converter that includes an input voltage source; a transformer having primary and secondary windings, on the primary and secondary sides, respectively; a main switch in series with the primary winding on the primary side; and a synchronous rectifier in series with the secondary winding on the secondary side, as well as (b) an active clamp circuit across the main switch, the active clamp circuit containing a clamp switch and the clamp capacitor in series with the clamp switch, and which electronic circuitry is characterized by an electrical charge, injected into the clamp capacitor after the main switch is turned off, in operation, such electrical charge having a first charge value. The method for operation includes the steps of (a) electrically-connecting the electronic circuitry with an auxiliary electronic circuit in series with the clamp capacitor, where the auxiliary circuit contains two rectifiers and an auxiliary energy storage; and (b) directing a current, flowing through a leakage inductance of the primary side in operation of said circuitry, to flow through the clamp capacitor and then through a first of the two rectifiers towards the auxiliary energy storage to change said first charge value to a second charge value. Here, the second charge value is smaller than the first charge value, and a current passing through the clamp capacitor after the mains switch is turned off is a clamp capacitor current. The method may additionally include switching the main switch off, said switching off causing said directing. Alternatively or in addition, the method may include a step of injecting the clamp capacitor current into the auxiliary energy storage. In any implementation, the electronic circuitry is characterized by period of time during which the clamp capacitor current, passing through the clamp capacitor after the main switch is turned off, reaches zero, such period of time having a first duration, while—with addition of the auxiliary circuit—the directing includes changing the first duration to a second duration, the second duration being shorter than the first duration. IN any implementation, the electronic circuitry is characterized by the clamp capacitor current (passing through the clamp capacitor after the main switch is turned off) that has a first rms value, and—with addition of the auxiliary circuit—the directing includes changing the first rms value to a second rms value, the second rms value being smaller than the first rms value. In any implementation, the step of electrically-connecting may include connecting an anode of the first of the two rectifiers and a cathode of the second of the two rectifiers to the clamp capacitor and/or connecting the auxiliary energy storage between the ground and a cathode of the first of the two rectifiers, and/or connecting an anode of the second of the two rectifiers to the ground. The auxiliary energy source may be configured as a voltage source that is a source of bias voltage of the flyback power converter. Alternatively or in addition, the method may include electrically-connecting a controlled switch in parallel with the first of the two rectifiers, the controlled switch configured to be turned "on" and "off" to maintain said bias voltage at a substantially constant level. In any implementation, the auxiliary energy source may be configured as a voltage source that is a source of bias voltage of the flyback power converter, in which case the source of bias voltage includes (i) a bias winding at the secondary side of the transformer, the bias winding coupled with the primary winding and the driving winding of the primary side of the transformer; (ii) a bias synchronous rectifier connected to a first terminal of the bias winding; and (iii) a bias capacitor connected to a second terminal of the bias winding at a node that is grounded. Optionally, in such a case, the source of bias voltage is configured to generate a bias voltage that is substantially proportional to an output voltage of the electronic circuitry measured between a terminal of the secondary winding and the ground.

Example 7: Advantageous Utilization of Energy of Leakage Inductance for Operation of the Flyback Converter A person of ordinary skill in the art will readily appreciate that the technological implementation of the idea of the invention can be taken one step further, by addressing a problem of utilization (that is, practical use) of the energy of the leakage inductance now stored in the auxiliary EM-energy storage (shown in FIG. 10 as a source Vb). This way, not only the rms current through the active clamp portion of the overall circuitry is reduced (with a corresponding reduction of the unwanted ringing in key waveforms), but such energy may be re-used.

In one implementation for example, the energy from the leakage inductance (which is harvested/injected in the voltage source Vb) can be used to provide some or all of the bias power in the flyback converter circuitry. One embodiment 1300 configured to implement such practical situation is presented in FIG. 13. Here, as compared with the embodiment 1000 of FIG. 10, a bias winding (L3, 66) with N3 turns in the corresponding coil, a synchronous rectifier (SRb, 68) and a bias capacitor (Cb1, 72) are added to form a portion 1310 of the electronic circuitry 1300. (The synchronous rectifier SRb in one embodiment can be configured as a simple diode.) Based on such arrangement, in case where the current injected in the bias portion 1310 is larger than the current required by the bias portion, the extra energy will be transferred to the secondary side via the rectifier SRb.

In some adapter applications, such as the adapter with power delivery, for example, where the adapter communicates with the load and provides the output voltage required by the load, the output voltage may often vary between 5 V and 20 V. If a conventional logic of the converter-related electronic circuitry is followed, the bias winding L3 would be tailored to provide a bias voltage that is proportionate with the output voltage of the converter. However, because the output voltage may vary in such a large range, the traditional arrangement bias winding simply may not work. According to the idea of the present invention, therefore, the energy transferred through the clamp capacitor through the diode rectifier 60 is used to provide the bias power. The current demanded by the bias is proportionate with the repetition frequency of operation (because at each cycle a certain amount to energy is used to drive the switching devices), which makes this implementation very suitable to the purpose as intended. At lighter loads in many applications the frequency decreases and as a result the bias current decreases and in this concept the current injection through D1 decreases as well.

Figure 13:
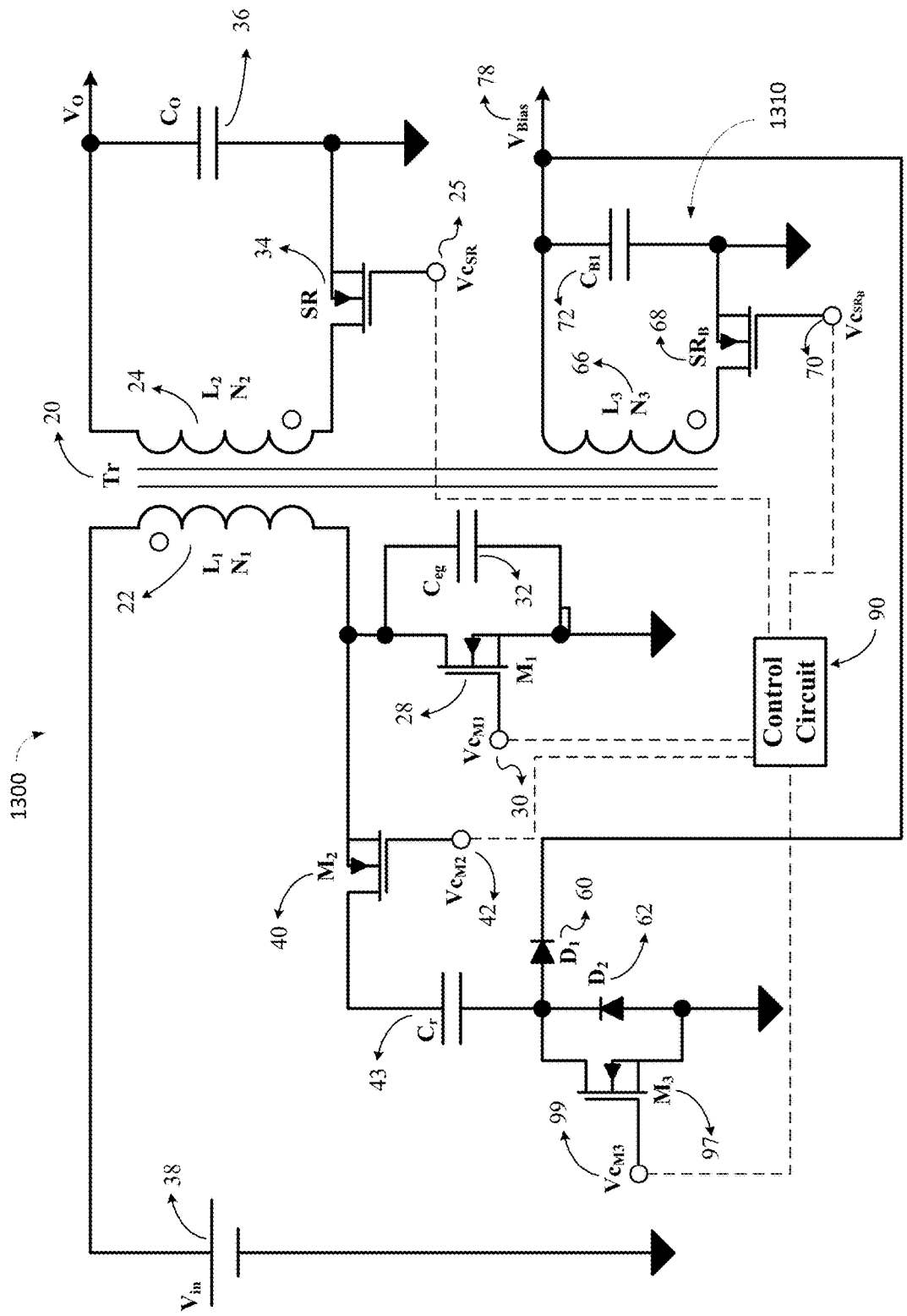
FIG. 13 depicts a flyback topology with an active clamp from FIG. 10, where a portion of the energy from the leakage inductance is transferred to the bias circuit.

As shown in FIG. 13, a controlled switch (M3, 97), is added to the circuitry that is controlled by a control signal (VcM3, 99) from the control circuit 90.

In adapter application with power delivery wherein the output voltage will vary between 5V to 20V and the bias winding method to deliver the bias power is not suitable, and the bias energy will come mostly from the clamp circuit via (D1, 60). In application with power delivery, the synchronous rectifier (SRb, 68) may be replaced by a diode or not activated. To regulate the (Vbias, 78) when the current injection through D1 is too large, the switch M3 can be turned "on" as needed and in this way control the average current through D1. For example, to decrease the average current through D1, the switch (M3, 97) has to be turned on for a longer period of time than an extent of time during which this switch is turned off. To increase the average current through D1, (M3, 97), has to be off for a longer period of time than that during which it is turned on. By tailoring the "on" time of (M3, 97), therefore, the average current through D1 can be regulated.

Notably, in further reference to FIG. 13, the control switch (SRB, 68) can provide substantially the same function as that described in reference to FIG. 6: the control signal (VcSRb, 70) is judiciously configured to extend the conduction after the current through the synchronous rectifier reaches zero and (SR, 34) is turned on.

It is appreciated, therefore, that one embodiment of the invention provides an electronic circuitry having primary and secondary sides and comprising (i) a flyback power converter that includes (i1) an input voltage source, (i2) a transformer having a primary winding on the primary side and a secondary winding on the secondary side, respectively, (i3) a main switch in series with the primary winding on the primary side, (i4) a synchronous rectifier in series with the secondary winding on the secondary side; (ii) an active clamp circuit, across the main switch, that contains a clamp switch and the clamp capacitor in series with the clamp switch; (iii) a bias portion of the electronic circuitry, including: (iii1) a bias winding on the secondary side of the transformer, (iii2) a bias synchronous rectifier connected to a first terminal of the bias winding, (iii3) a bias capacitor connected to a second terminal of the bias winding at a first node that is grounded; (iv) an auxiliary circuit containing two rectifiers connected such that a cathode of a first of the two rectifiers is directly electrically connected with a cathode of the active clamp circuit at a second node, an anode of a second of the two additional rectifiers is directly electrically connected with the cathode of the first of the two rectifiers at the second node, (v) a control switch connected between the second node and the ground, and (vi) a control electronic circuitry configured to generate a control signal governing an operation of the control switch and electrically connected to each of the main switch, the bias synchronous rectifier, and the control switch. In one implementation, the operation of such electronic circuitry is characterized by a first value of rms current through the clamp capacitor and the auxiliary circuit is configured to reduce the rms current through the clamp capacitor from the first value to a second value, the second value being at least 40% lower than the first value. In any implementation the clamp switch may be configured a) to be turned on at a moment of time after the main switch is turned off and b) to be turned off at a moment of time prior to the moment of time at which current passing through the secondary winding reaches a zero level. In any implementation, a cathode of the second of the two rectifiers may be directly electrically connected with a terminal of the bias winding (which terminal is not directly connected to the bias synchronous rectifier) to provide, in operation of the electronic circuitry, a bias voltage such that a level of the bias voltage is regulated as a result of operation of the control switch. The control switch may be placed in parallel with the first of the two rectifiers and configured to be turned "on" and "off", in operation of the electronic circuitry, to maintain said level of the bias voltage substantially constant as a function of time.

Figure 19:
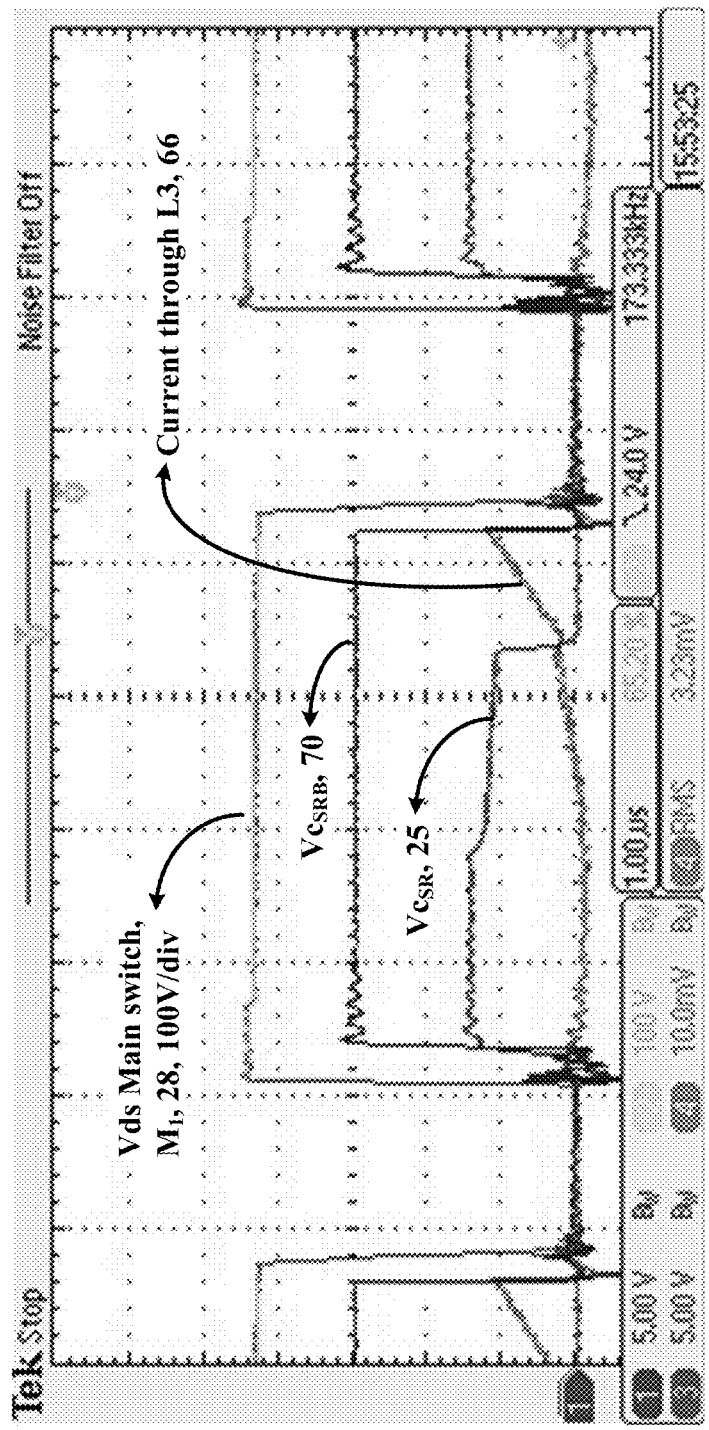
FIG. 19 illustrates several key waveforms representing an operation of the circuit depicted in FIG. 13.

FIG. 19 illustrates empirically-acquired several key waveforms representing an operation of the circuit depicted in FIG. 13. From the discussion presented above, a person of skill in the art will readily appreciate that, according to the idea of the invention, the (SRb, 68) is appropriately controlled to be "on" after the moment when (SR, 34) is turned "off", to obtain zero voltage switching conditions across (M1, 28) in a critical conduction mode of operation of the electronic circuit 1300.

The waveforms in FIG. 19 are: voltage Vds across the main switch (M1, 28), the control voltage (VcSRb, 70) governing the operation of SRb; (VcSR, 25), which is a control voltage signal for synchronous rectifier (SR, 34) on the secondary side; and the current through the bias winding (L3, 66). A skilled artisan will appreciate that the switch (SRb, 68) is turned "on" for a period of time that is longer than the "on" time of the (SR, 34). As a result, the current through the bias winding (L3, 66) starts to build up with a higher (steeper) slope. At the end of the period of conduction of the (SRb, 68), the current passing through (L3, 66) has, therefore, a higher/larger amplitude to discharge (Ceg, 32) across the main switch M1 towards zero, as is depicted by the curve "Vds Main switch, M1, 28" of FIG. 19.

Notably, in this case—and in contradistinction with the operation discussed in reference to FIG. 6—the function of injecting more energy into the natural ringing produced by the circuit (and resulting in effect substantially similar to that discussed, in reference to FIG. 6, as a conversion of the ringing shown by the portion 48 to the portion 93) is carried out by the element (SRb, 68) on the secondary side while the same function was previously performed with the switch (M2, 40) on the primary side. It is understood, therefore, that when utilizing this embodiment, the zero voltage switching is maintained in critical mode operation without the use of energy circulating energy through the active clamp. In the current embodiment, the switch (SRb, 68) therefore is configured to perform several functions: not only as a rectifier for bias energy, but also as means/vehicle for additional energy injection in the natural ringing across the main switch for the purpose of obtaining zero voltage switching in the critical conduction mode.

Accordingly, embodiments of the invention provide a method for operating the electronic circuitry of FIG. 13, which method includes at least the step of switching the bias synchronous rectifier on for a first period of time that is longer than a second period of time to increase a starting amplitude of a current with which a parasitic capacitance reflected across the main switch is being discharged at an end of a conduction period of the bias synchronous rectifier. (Here, the second period of time being a period of time during which the synchronous rectifier stays on.) Alternatively or in addition, the method may satisfy at least one of the following conditions: a) forming zero-voltage switching conditions across the main switch in a critical mode of operation of the electronic circuitry without the use of energy circulating through the active clamp; and b) having the bias synchronous rectifier configured to operate as a rectifier and as an energy-injector in a ringing across the main switch.

Example 8: Using the Leakage Inductance Energy to Obtain Zero-Voltage Switching Conditions for the Mains Switch of the Circuit Building upon the previous Example, the harvested energy of the leakage inductance may be re-used to reduce (and even eliminate) one of the largest losses in a flyback-type converter, specifically the switching losses associated with the hard discharge of (Ceq, 32) when the main switch (M1, 28) is turned on. The specific example of the circuit 1500 of FIG. 15 achieves this goal: this circuitry is configured to harvest, in operation as illustrated schematically in FIG. 16, the leakage inductance energy and use such energy to discharge the parasitic capacitance of the capacitor Ceq across the main switch in order to create zero voltage switching conditions for the main switch.

The embodiment 1500 configured such as to have the capacitor (Crc, 110) be charged with the harvested leakage inductance energy, and then, in operation, the energy from Crc, 110), is further utilized to inject a pulse of current into the transformer (Tr, 20) via the auxiliary (current injection) winding 102 with the purpose of discharging the parasitic capacitance (Ceg, 32). Here, the current injection circuit is formed with the use of a current injection winding (Linj, 102), a current injection switch (Minj,106) such as a Mosfet, controlled by a current injection control signal (VcMinj, 112), and an energy source (represented by charged capacitor Crc).

In addition to the capacitor Crc, in one implementation a smaller capacitor (Cinj, 104) is also added as shown. (In such implementation, the capacitance of the Cinj, capacitor is preferably at least 10 times lower than the capacitance of the Crc.) In between (Cinj, 104) and (Crc, 110), a diode (Dinj, 108) is placed with its anode connected to (Crc, 110). The optional capacitor (Cinj, 104) is charged in forward mode via the winding 102, during the period of conduction of the main switch (M1, 28). The energy in this capacitor (Cinj, 104) is preferably smaller than the energy coming from the Crc. The main goal of optional use of the Cinj is to shape the current through the current injection switch (Minj, 106) to become negative before the moment of time when the (VcMinj, 112) turns off. In addition, the capacitor Cinj adds energy into the current injection circuit.

Accordingly, an embodiment of the invention provides an electronic circuitry having primary and secondary sides and comprising: (a) a flyback power converter that includes an input voltage source; a transformer having a primary winding on the primary side and a secondary winding on the secondary side, respectively; a main switch in series with the primary winding on the primary side; a parasitic capacitor across the main switch; and a synchronous rectifier in series with the secondary winding on the secondary side, (b) an active clamp circuit across the main switch, the active clamp circuit containing a clamp switch and the clamp capacitor in series with the clamp switch, and (c) a current injection circuit including a current injection winding on the secondary side of the transformer; a current injection switch connected to a first terminal of the current injection circuit; and a source of energy between a second terminal of the current injection circuit and the ground, where the current injection circuit is configured, in operation of the electronic circuitry, to collect energy of a leakage inductance of the electronic circuitry and to inject this energy in a form of a pulse of current into the transformer via the current injection winding to discharge the parasitic capacitor to create a zero voltage switching condition for the main switch. The electronic circuitry may additionally include an auxiliary circuit that contains (i) two rectifiers connected such that a cathode of a first of the two rectifiers is directly electrically connected with a cathode of the active clamp circuit at a second node, an anode of a second of the two additional rectifiers is directly electrically connected with the cathode of the first of the two rectifiers at the second node; and a control switch connected between the second node and the ground. The embodiment of the electronic circuitry may further include a control electronic circuitry configured to generate a control signal governing an operation of the control switch and electrically connected to each of the main switch, the bias synchronous rectifier, and the control switch. In any implementation, the combination of the flyback converter with the active clamp (and in absence of the auxiliary circuit) is characterized by a first value of rms current through the clamp capacitor. In any embodiment, the auxiliary circuit is configured to reduce the rms current through the clamp capacitor from the first value to a second value, such that the rms current passing through the clamp capacitor of the electronic circuit has the second value, the second value being at least 40% lower than the first value. In any embodiment, the clamp switch may be configured i) to be turned on at a moment of time after the main switch is turned off and ii) to be turned off at a moment of time prior to the moment of time at which current passing through the secondary winding reaches a zero level. Optionally, the source of energy is configured as a first capacitor, and the current injection circuit additionally includes an injection capacitor in parallel with the first capacitor, to shape, in operation of the electronic circuitry, a current through the current injection switch to become negative before a moment of time when the current injection switch turns off. In at least one implementation, a capacitance of the first capacitor is at least 10 times higher than a capacitance of the injection capacitor.

Figure 15:
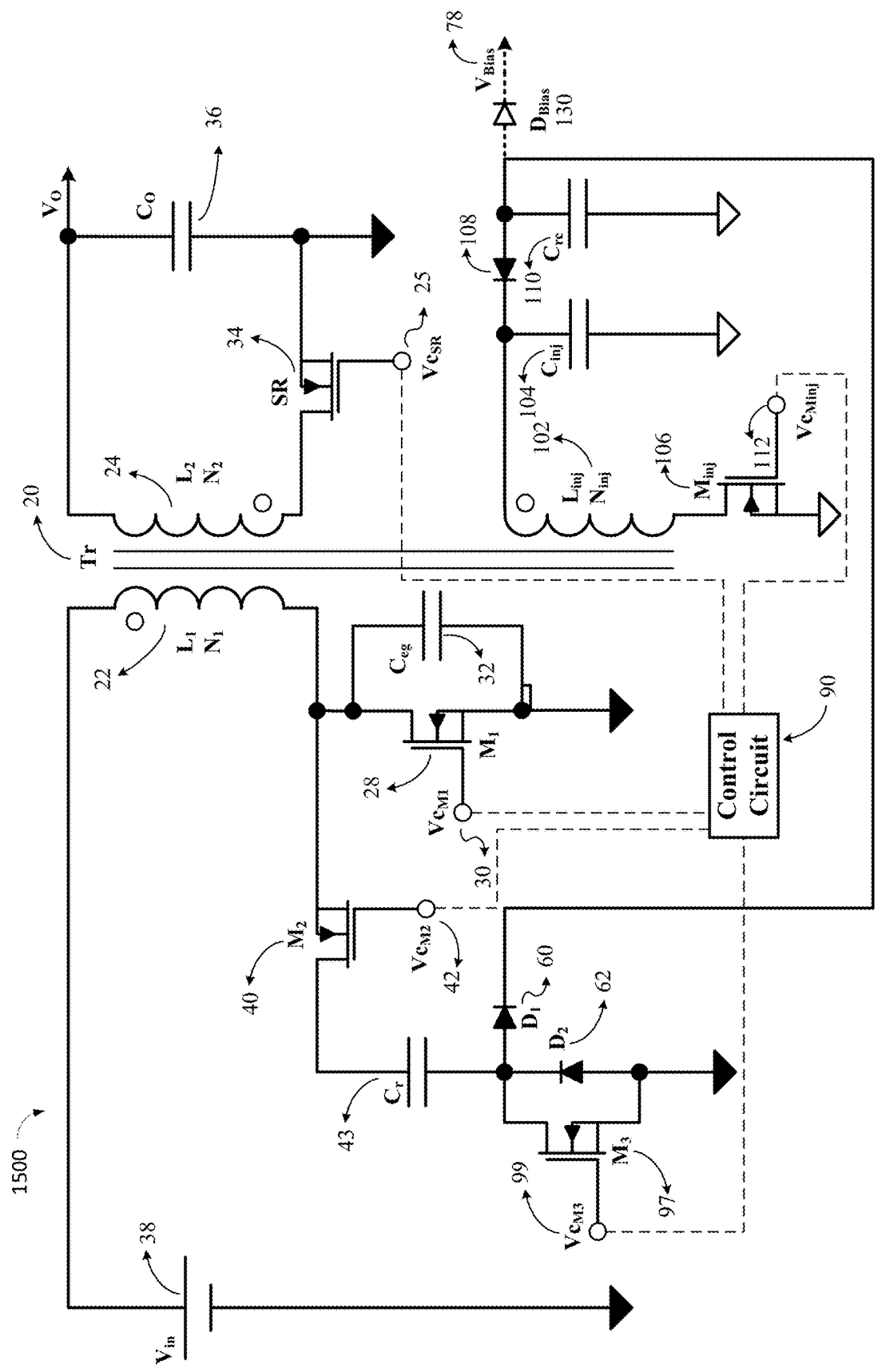
FIG. 15 illustrates the circuitry utilizing a flyback topology with an active clamp (from FIG. 10) and containing the current injection circuit that is powered by the leakage inductance energy.
Figure 16:
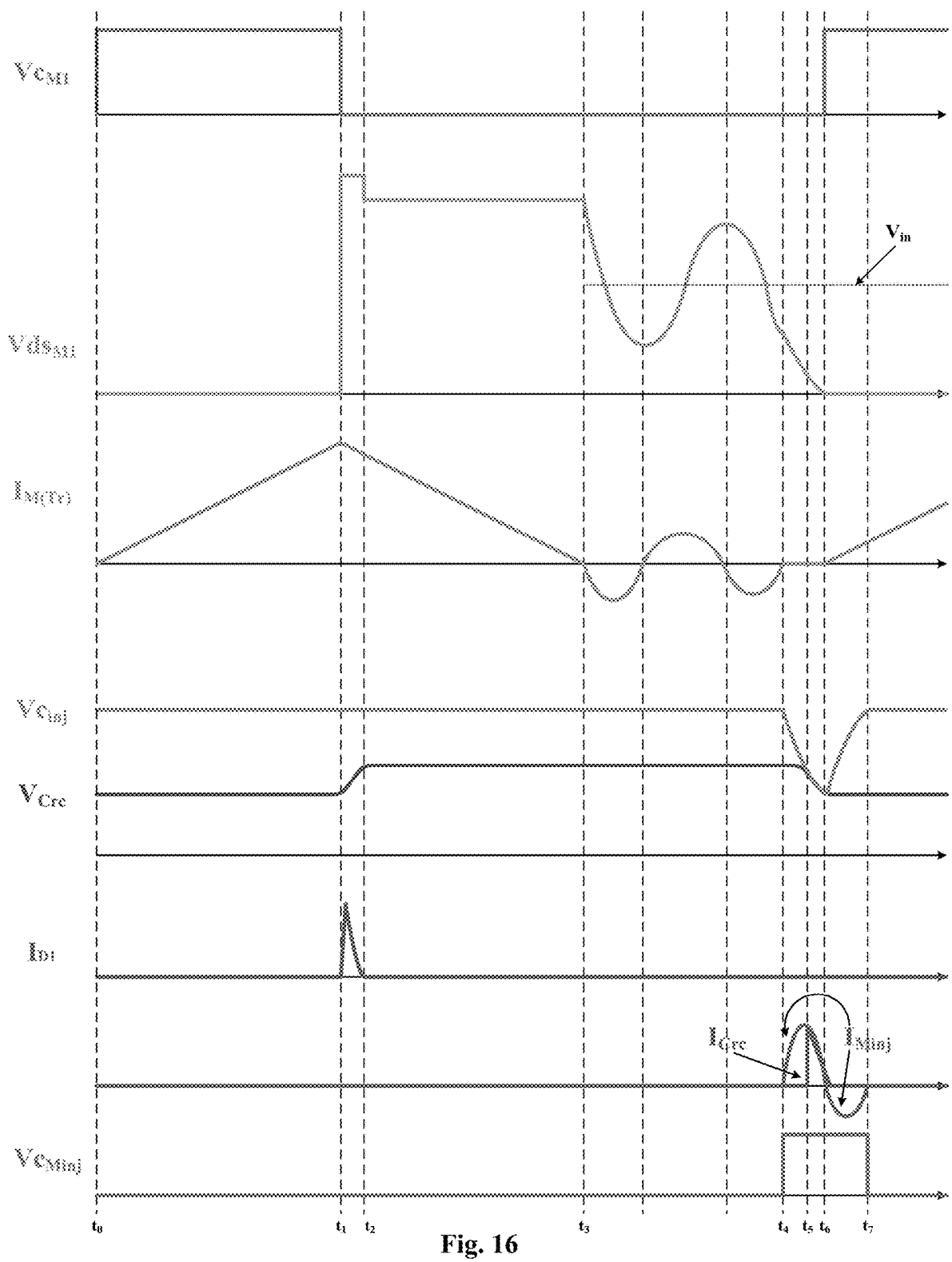
FIG. 16 illustrates the key waveforms of the circuit depicted in FIG. 15.

The key waveforms of the circuit of FIG. 15 are presented in FIG. 16. These key waveforms include: a) the control signal (VcM1, 30) for the main switch (M1,28); b) the voltage (VdsM1) across the main switch (M1, 28); c) the magnetizing current through the transformer (Tr, 20); d) the voltage $V_{Cinj}$ across the capacitor Cinj; e) ID1, the current through the rectifier (D1,60), f) the current through the switch Mini, where displayed is the current coming from Crc; and g) the control signal, VcMinj, for the current injection switch.

Considering the operation of the circuit 1500, at the moment t1 the main switch M1 turns off when the magnetizing current $I_M$Tr is at its peak. The current through the leakage inductance continues to flow via (M2, 40) and (Cr, 43) and further through D1 to charge the capacitor (Crc, 110). The voltage across Crc increases between the moments of time t1 and t2 as depicted in FIG. 16, with the waveform VCrc due to the current passing through D1 being injected in the capacitor Crc.

Between the moments t2 and t3, the energy contained in the magnetizing current of the transformer (Tr, 20) is transferred to the secondary side via (SR, 34) and then stored in capacitor (Co, 36). After the moment t3, the primary inductance of the transformer (Tr, 20) starts oscillating with the capacitor Ceq, as shown by the curve VdsM1 representing voltage across the main switch M1.

At t4 (which moment coincides with the valley of such oscillation), the switch Minj is turned on by the control signal (VcMinj, 112). When the current injection Mosfet (Minj, 106) is turned on, the capacitor (Cinj, 104) starts to discharge and the current through the switch Minj increases. The leakage inductance of the transformer forms a resonant circuit with the capacitor (Ceq, 32) and the current through Minj is substantially sinusoidal. The voltage across (Cinj, 104) decays until it reaches the voltage level across Ccr at the moment t5.

After t5, the current injection is provided by the energy contained in the capacitor Crc (in parallel with Cinj, in this example). As was already mentioned, it is preferred that the capacitance of Cinj much smaller that the capacitance of the Crc (one-tenth in value or even smaller), in which case after the moment t5 most of the energy is delivered from the capacitor Crc.

At the moment t6, the current injection current (that is, the current through Minj) reaches zero. After t6, the current through Minj becomes negative, because it flows into the Cinj capacitor charging it between the moment t6 to t7, during the time when both the main switch M1 and the current injection switch Minj are on.

At the moment t7, the current injection switch Minj is turned off by the control signal VcMinj.

It is appreciated that the current injection circuit depicted in FIG. 15 is also operational without the capacitor Cinj: the role of Cinj is not essential to the performance of this circuit, because most of the energy is delivered from the capacitor Crc, energy which comes from the leakage inductance energy of the transformer (Tr, 20).

In the circuit 1500 of FIG. 15, the amplitude of the current injection is self-adjusting function of the voltage across the main switch when Minj is turned on. Unlike other current injection circuits (in which energy usually comes only from Cinj circuit), in this current injection circuit the voltage across Ccr does not change significantly. The current injection amplitude is a function of the voltage across the main switch M1 at the time when the current injection turns on. For low voltage across the main switch the amplitude of the current injection it is small. If the voltage across the main switch is high when the current injection turns on then the amplitude of the current injection high. If the voltage across M1 is small (such as in the case of the lowest point of the valley), the amplitude of the current injection is small, and if the turn "on" of Minj occurs at a higher input voltage across M1—the amplitude of the current injection increases.

As depicted in FIG. 16, the voltage across M1 decays as a result of discharge of (Ceq, 32) by the current injection through Minj reflected into the primary winding 22. At t6, the voltage across M1 is zero, which creates zero voltage switching conditions for M1.

In contradistinction with the circuitry of related art, where the leakage inductance energy is dissipated and there is additional dissipation of energy contained in the parasitic capacitance (Ceq, 32), in this embodiment of the invention the leakage inductance energy is utilized to discharge the parasitic capacitance Ceq and create zero voltage switching conditions for M1.

In the event the current injection current is small (because the voltage across M1 it is low when the Minj is turned on), the energy injected into Crc would be higher than the energy taken out through the current injection. A diode (Dbias, 130) is placed between Crc and the bias circuit to allow the extra energy from the leakage inductance to be used for the bias utilization.

Accordingly, embodiments of the invention provide a method for operating the electronic circuitry of FIG. 15. Such method includes the steps of (a) turning the main switch off at a moment t1, when a magnetizing current of the transformer is at a peak reached during of a period of conduction of the main switch; (b) between the moment t1 and a moment t2, charging the source of energy, with a current from a leakage inductance of the electronic circuitry that has passed through the active clamp and through the second of the two rectifiers, to increase a voltage across the source of energy; and (c) transferring energy contained in the magnetizing current to the secondary side via the synchronous rectifier to store said energy in an output capacitor disposed between the ground and a terminal of the secondary winding—to harvest energy of leakage inductance of the electronic circuitry and to use said energy to discharge said parasitic capacitor to crease zero-voltage switching conditions for the main switch. The method may additionally include the step of: at a moment t3 (after the moment t2), having a substantially constant voltage across the main switch changed after the moment t2, to an oscillating voltage and then turning the current injection switch on. In any implementation, the method may include the following step(s): after the current injection switch has been turned on, discharging the source of energy to shape a current passing through the current injection switch to be substantially sinusoidal, and switching off the current injection switch at a moment when the current passing through the current injection switch is substantially zero. (The switching off may include switching off the current injection switch after a moment when the current passing through the current injection switch became negative.)

Example 9: Self-Driven Circuit

Referring again to the methodology described in reference to FIGS. 10, 11, 12, a skilled artisan will readily appreciate that another advantage of the discussed methodology is provided by the proper use of the control signal for the clamp switch (M2, 40). The clamp switch M2 is turned "on" for a constant time that is much shorter (for example, by more than 50% or so) than the "on" time of such switch as used by related art, and, at the same time, the exact moment of turning the clamp switch M2 "off" is not particularly critical. Specifically, as shown below, the turn "off" of the switch M2 can be effectuated at any moment after the moment t3, because there is no more current circulating through the clamp switch M2.

As a result, the driving signal for the clamp switch can be derived very easily from the transformer using a self-driving approach. This implementation is outlined in reference to FIG. 14.

Here, embodiment 1400 outlines a flyback converter with an active clamp and the leakage-inductance-energy-harvesting circuit formed by (D1,60), (D2, 62) and the bias circuit formed by a bias winding 66, a rectifier means (SRb, 68), a bias capacitor (Cb1, 72). However, an additional winding 82 (which represents the self-driven clamp winding) has been appropriately introduced on the primary side between a differential and protection circuit 84 and the primary winding 22 such that this additional winding 82 is connected between the source of the clamp switch (M2, 40) the differential & protection circuit 84.

The differential & protection circuit 84 is appropriately configured to turn the clamp switch (M2, 40) "off" for a predetermined period of time that is shorter than the time during which (SR, 34) is on and the "turn on" of the clamp switch (M2, 4) shall be initiated by the change of polarity in the transformer after the main switch (M1, 28) is turned "off". The exact moment of the turn off the switch M2, on the other hand, is not as critical, because in the event (M2, 40) is turned off after the moment t3 and before the moment t4, there is no current flow through the (M2,40).

Figure 14:
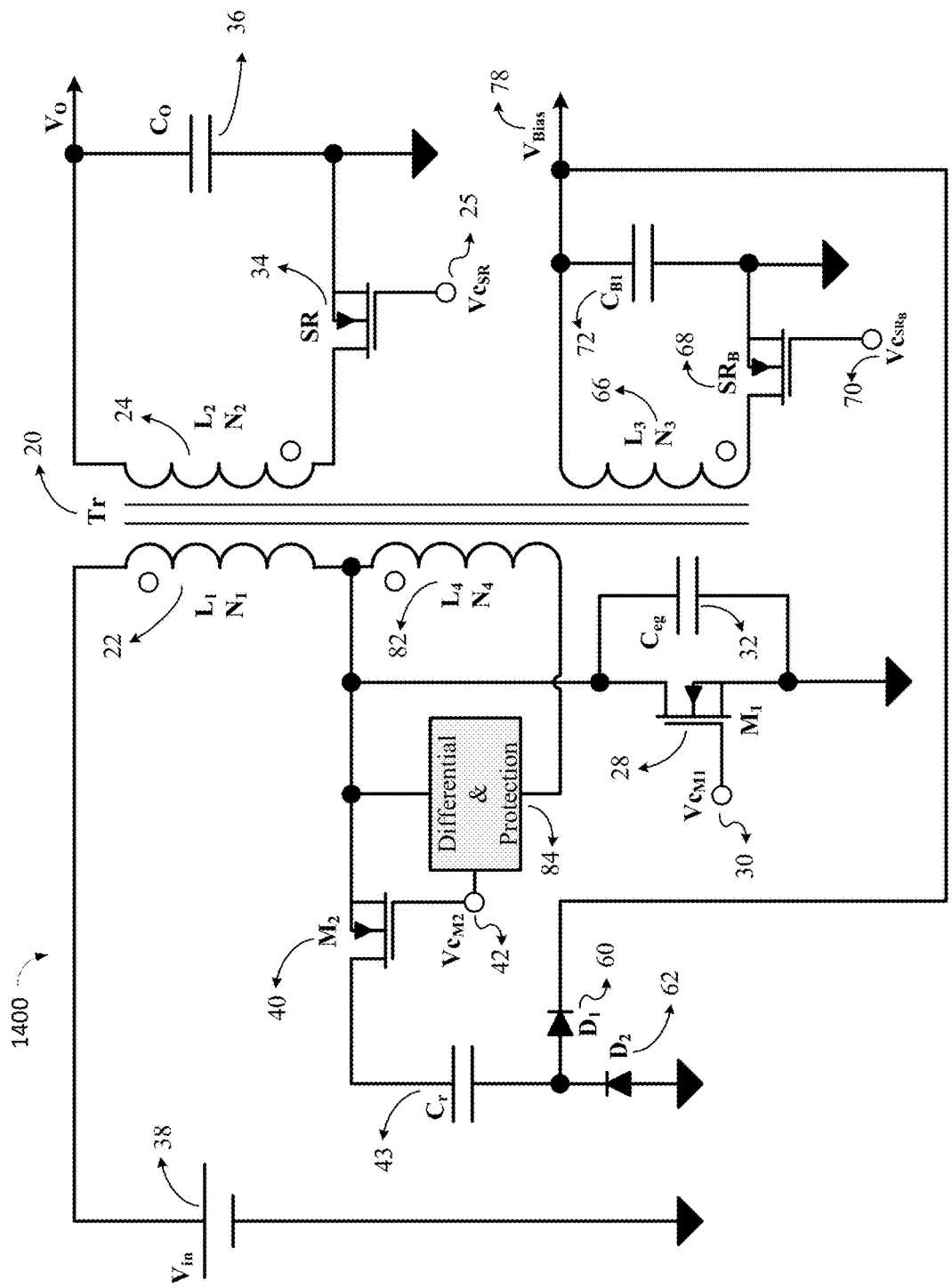
FIG. 14 illustrates the circuitry utilizing a flyback topology with an active clamp (from FIG. 10), in which the clamp switch is self-driven from the main transformer.

Due to the judicious configuration of the circuitry of FIG. 14, the full energy from the leakage inductance of transformer (Tr, 20) is delivered through D1 to the capacitor (Cb1, 72). This energy is used for bias needs of the converter, and the extra energy is transferred into the secondary side capacitor Co.

In critical operation mode of a flyback converter, the main switch (M1, 28) is turned "on" after the current through (SR, 34) reaches zero and (SR, 34) is turned off. At that time, the voltage across M1 starts collapsing (as depicted in curve VdsM1, at t5 of FIG. 4). The inductance of the primary winding L1, starts resonating with the parasitic capacitance reflected across the primary switch, Ceq, 32, as depicted by the curves 50 and 48. In the critical conduction operation the main switch M1, 28 will turn on at the first valley of the ringing (see portions 48, 50 of FIG. 4). Notably, in most of the current applications the first valley of the ringing does not reach zero voltage. That may happen, however, if the current (If, 46) through the clamp capacitor (Cr, 43), depicted in FIGS. 4, 5 and 6, has enough amplitude to increase the natural ringing as depicted in FIG. 6 (by portion 93 of the curve VdsM1).

Accordingly, embodiments of the invention provide an electronic circuitry having primary and secondary sides and comprising: (a) a flyback power converter that includes an input voltage source; a transformer having a primary winding and a driving winding on the primary side and secondary (with the primary and driving windings being in series and connected to one another at a winding node); a main switch in series with the primary winding on the primary side and directly connected to the winding node; and a synchronous rectifier in series with the secondary winding on the secondary side; (b) an active clamp circuit across the main switch, the active clamp circuit containing a clamp switch and the clamp capacitor in series with the clamp switch; (c) a bias portion of the electronic circuitry, including a bias winding on the secondary side of the transformer; a bias synchronous rectifier connected to a first terminal of the bias winding; a bias capacitor connected to a second terminal of the bias winding at a first node that is grounded; and (c) an auxiliary circuit containing two rectifiers connected such that (c1) a cathode of a first of the two rectifiers is directly electrically connected with a cathode of the active clamp circuit at a second node, and (c2) an anode of a second of the two additional rectifiers is directly electrically connected with the cathode of the first of the two rectifiers at the second node. Here, a cathode of the second of the two rectifiers is directly electrically connected with a terminal of the bias winding (which terminal is not directly connected to the bias synchronous rectifier) to provide, in operation of the electronic circuitry, a bias voltage. The electronic circuitry further contains a protection circuit connected in parallel with the driving winding and configured to provide a control signal governing an operation of the clamp switch. In any implementation, the protection circuit may include a low pass filter in series with the driving winding. In any implementation, the flyback converter with the active clamp (and in absence of the auxiliary circuit) are characterized by a first value of rms current through the clamp capacitor. In any implementation, the auxiliary circuit is configured to reduce the rms current through the clamp capacitor from the first value to a second value, such that the rms current passing through the clamp capacitor of the electronic circuit has the second value, the second value being at least 40% lower than the first value. In any implementation, the clamp switch may be configured i) to be turned on at a moment of time after the main switch is turned off and ii) to be turned off at a moment of time prior to the moment of time at which current passing through the secondary winding reaches a zero level.

Figure 18:
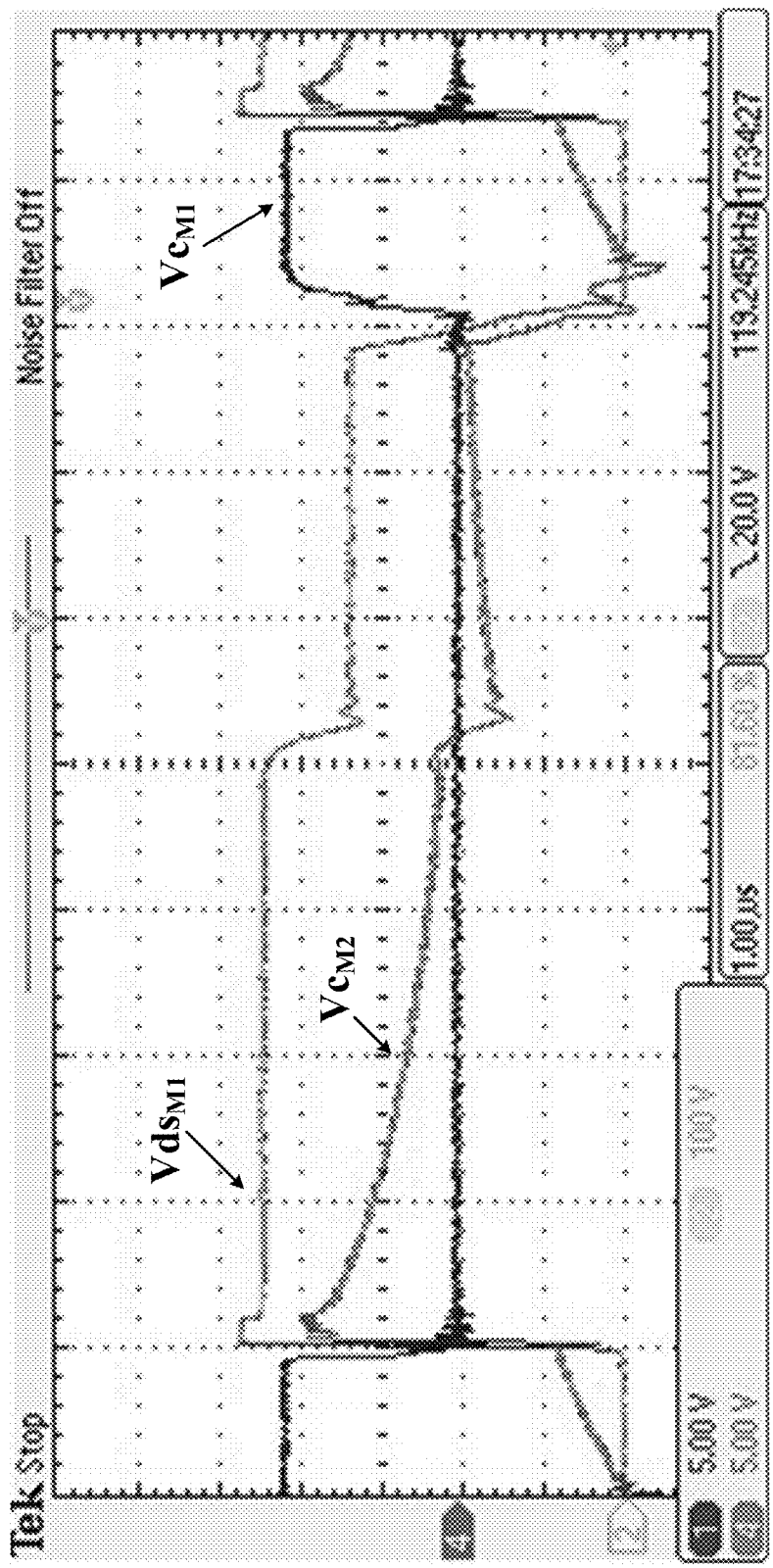
FIG. 18 illustrates sine key waveforms of operation of the circuit of FIG. 14.

FIG. 18 presented the empirically-acquired waveforms of the self-driven circuit, which include a) the voltage VdsM1 across the main switch (M1, 28), b) the control signal VcM1 of the main switch (M1, 28); and c) the voltage VcM2 between the gate and source of the switch M2. As can be seen from these experimental data, the gate-to-source voltage VcM2 across the switch M2 is decaying towards zero before the end of the conduction time for (SR, 34). (While the waveform for the (SR, 34) is not presented for simplicity, this synchronous rectifier conducts—after the main switch M1 turns off—for the time that the voltage VdsM1 across M1 is at the Vin level, by analogy with the corresponding waveform of FIG. 5.) In conclusion, the embodiment is configured to tailor the moment of the turn off the switch M2 $i$ to be somewhere between t3 and t4.

Figure 17:
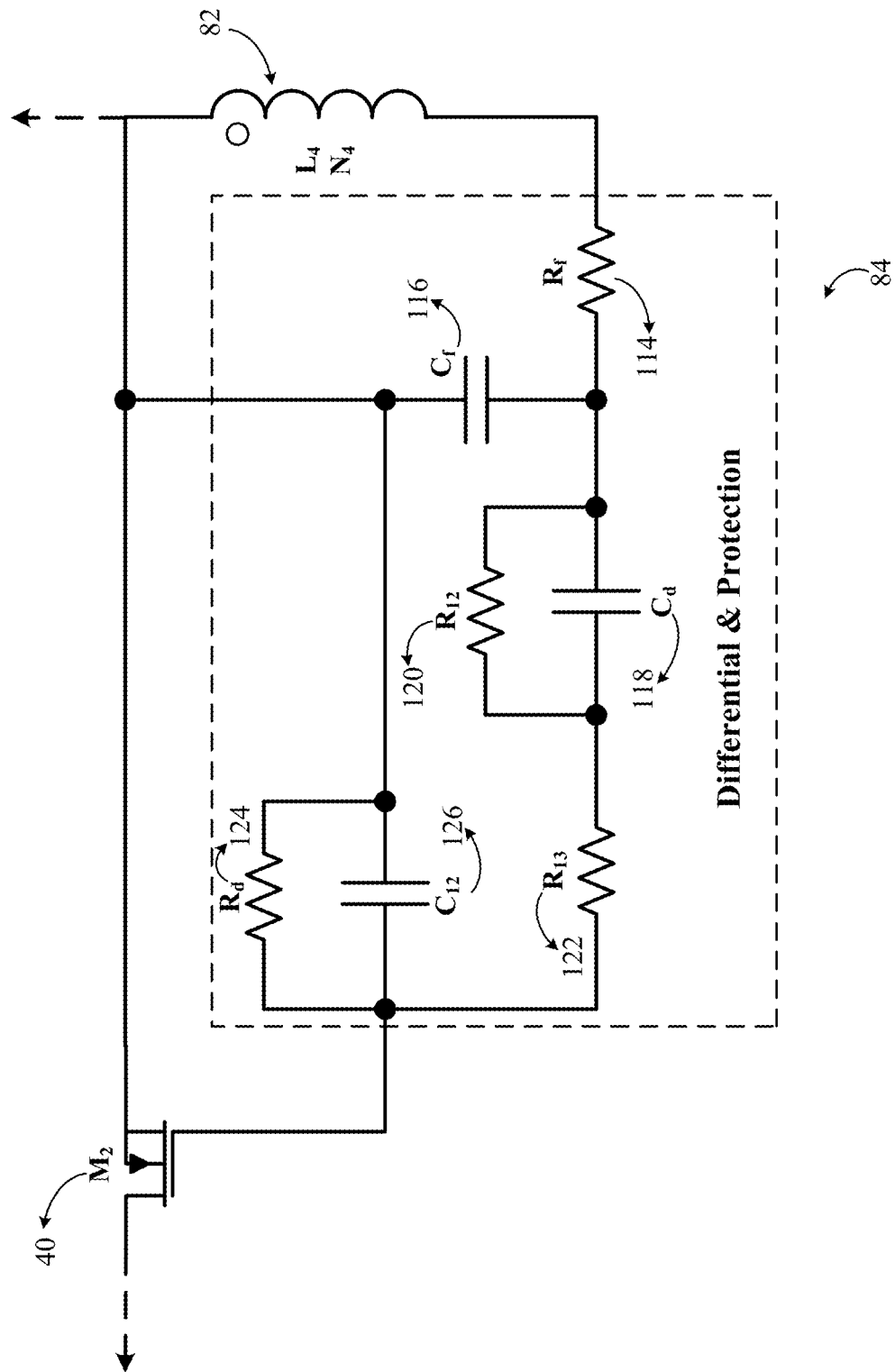
FIG. 17 is a schematic of the circuit labeled "Differential & Protection", of FIG. 14.

FIG. 17 illustrates a schematic of a possible implementation of the circuit 84, labelled "Differential & Protection" in FIG. 14. Here, the capacitor (Cf, 116) and the resistor (Rf, 114) form a low pass filter to protect against spikes and ringing across the driving winding (L4, 82), to prevent the switch M2 from turning "on" accidentally. The electronic elements (Cd, 118) and (Rd, 124) form a differential circuit designed to shape the voltage in the gate of the switch M2 (as depicted by the waveform VcM2 of FIG. 18). The electronic elements (R13, 122) and (C12, 126) form an additional low pass filter to prevent the turn "on" of M2 by either noise or/and spikes of voltage from the winding L4.

To effectuate the operation of an embodiment of the invention, the judicious use of a processor controlled by application-specific instructions stored in a tangible memory element may be required. Those skilled in the art should readily appreciate that required algorithmical functions, operations, and decisions may be implemented as computer program instructions, software, hardware, firmware or combinations thereof. Those skilled in the art should also readily appreciate that instructions or programs defining the functions and elements of the present invention may be delivered to a processor in many forms, including, but not limited to, information permanently stored on non-writable storage media (e.g. read-only memory devices within a computer, such as ROM, or devices readable by a computer I/O attachment, such as CD-ROM or DVD disks), information alterably stored on writable storage media (e.g. floppy disks, removable flash memory and hard drives) or information conveyed to a computer through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

Within this specification, embodiments have been described in a way that enables a clear and concise specification to be written, but it is intended and will be appreciated that embodiments may be variously combined or separated without parting from the scope of the invention. In particular, it will be appreciated that each of the features described herein is applicable to most if not all aspects of the invention.

The disclosure of each of U.S. provisional patent application 62/571,594, U.S. patent application Ser. Nos. 15/825, 647, 14/274,598, and 14/933,476 is incorporated by reference herein.

The invention as recited in claims appended to this disclosure is intended to be assessed in light of the disclosure as a whole, including features disclosed in prior art to which reference is made.

For the purposes of this disclosure and the appended claims, the use of the terms "substantially", "approximately", "about" and similar terms in reference to a descriptor of a value, element, property or characteristic at hand is intended to emphasize that the value, element, property, or characteristic referred to, while not necessarily being exactly as stated, would nevertheless be considered, for practical purposes, as stated by a person of skill in the art. These terms, as applied to a specified characteristic or quality descriptor means "mostly", "mainly", "considerably", "by and large", "essentially", "to great or significant extent", "largely but not necessarily wholly the same" such as to reasonably denote language of approximation and describe the specified characteristic or descriptor so that its scope would be understood by a person of ordinary skill in the art. In one specific case, the terms "approximately", "substantially", and "about", when used in reference to a numerical value, represent a range of plus or minus 20% with respect to the specified value, more preferably plus or minus 10%, even more preferably plus or minus 5%, most preferably plus or minus 2% with respect to the specified value. As a non-limiting example, two values being "substantially equal" to one another implies that the difference between the two values may be within the range of +/−20% of the value itself, preferably within the +/−10% range of the value itself, more preferably within the range of +/−5% of the value itself, and even more preferably within the range of +/−2% or less of the value itself. The term substantially equivalent is used in the same fashion.

The use of these terms in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated falls and may vary within a numerical range defined by an experimental measurement error that is typical when using a measurement method accepted in the art for such purposes.

Modifications to, and variations of, the illustrated embodiments may be made without departing from the inventive concepts disclosed herein. Furthermore, disclosed aspects, or portions of these aspects, may be combined in ways not listed above. Accordingly, the invention should not be viewed as being limited to the disclosed embodiment(s). In addition, the terminology used herein is with the purpose of describing particular embodiments only, and is not intended to limit the scope of the present invention.

The invention claimed is:

1. An electronic circuitry having primary and secondary sides and comprising:
   a flyback power converter including:
   an input voltage source;
   a transformer having primary and secondary windings, on the primary and secondary sides, respectively;
   a main switch in series with the primary winding on the primary side; and
   a synchronous rectifier in series with the secondary winding on the secondary side;
   an active clamp circuit across the main switch, the active clamp circuit containing a clamp switch and the clamp capacitor in series with the clamp switch;
   an auxiliary circuit that contains two additional rectifiers connected in parallel with one another and in series with an electronic component configured to store electromagnetic energy;

wherein the clamp switch is configured to be turned on at a moment of time after the main switch is turned off;

wherein the clamp switch is configured to be turned off at a moment of time prior to the moment of time at which current passing through the secondary winding reaches a zero level;

wherein the electronic circuitry is characterized by a first value of rms current through the clamp capacitor;

wherein a cathode of a first of the two additional rectifiers is directly electrically connected with a cathode of the active clamp circuit;

wherein an anode of a second of the two additional rectifiers is directly electrically connected with the cathode of the first of the two additional rectifiers;

wherein a cathode of the second of the two additional rectifiers is directly electrically connected with a first terminal of said electronic component; and wherein a second terminal of said electronic component is electrically connected with an anode of the second of the two additional rectifiers, wherein said auxiliary circuit is configured to reduce the rms current through the clamp capacitor from the first value to a second value, the second value being at least 40% lower than the first value.

2. The electronic circuitry according to claim 1, wherein the electronic component is configured as a voltage source, and wherein the first terminal is a positive terminal of said voltage source and the second terminal is a negative terminal of said voltage source.

3. The electronic circuitry according to claim 1, wherein the electronic component is configured as a voltage source, and wherein said voltage source provides bias voltage to said flyback power converter.

4. The electronic circuitry according 3, wherein the primary side includes a driving winding, a first terminal of the driving winding directly connected to a terminal of the primary winding, the second terminal of the driving winding directly connected to a differential electronic circuitry, wherein the differential electronic circuitry is configured to generate a control voltage signal to the clamp switch to drive the active clamp circuit.

5. The electronic circuitry according to claim 1, wherein the electronic component is configured as a voltage source that is a source of bias voltage of the flyback power converter, and further comprising a controlled switch placed in parallel with said first of the two additional rectifiers and configured to be turned "on" and "off" to maintain said bias voltage at a substantially constant level.

6. The electronic circuitry according claim 1, wherein the electronic component is configured as a voltage source that is a source of bias voltage of the flyback power converter, and wherein the source of bias voltage includes a bias winding at the secondary side of the transformer, the bias winding coupled with the primary winding and the driving winding of the primary side of the transformer;

a bias synchronous rectifier connected to a first terminal of the bias winding; and a bias capacitor connected to a second terminal of the bias winding at a node that is grounded.

7. The electronic circuitry according to claim 6, wherein the source of bias voltage is configured to generate a bias voltage that is substantially proportional to an output voltage of the electronic circuitry measured between a terminal of the secondary winding and the ground.

8. A method for operation of electronic circuitry having primary and secondary sides and comprising:

a flyback power converter including
an input voltage source,
a transformer having primary and secondary windings, on the primary and secondary sides, respectively,
a main switch in series with the primary winding on the primary side, and
a synchronous rectifier in series with the secondary winding on the secondary side, and
an active clamp circuit across the main switch, the active clamp circuit containing a clamp switch and the clamp capacitor in series with the clamp switch,
wherein said circuitry is characterized by an electrical charge, injected into the clamp capacitor after the main switch is turned off, in operation, said electrical charge having a first charge value, the method comprising:
electrically-connecting said circuitry with an auxiliary electronic circuit in series with the clamp capacitor, wherein the auxiliary circuit contains two rectifiers and an auxiliary energy storage;
and
directing a current, flowing through a leakage inductance of the primary side in operation of said circuitry, to flow through the clamp capacitor and then through a first of the two rectifiers towards the auxiliary energy storage to change said first charge value to a second charge value,
wherein the second charge value is smaller than the first charge value,
wherein a current passing through the clamp capacitor after the mains switch is turned off is a clamp capacitor current.

9. The method according to claim 8, comprising switching the main switch off, said switching off causing said directing.

10. The method according to claim 8, comprising injecting the clamp capacitor current into the auxiliary energy storage.

11. The method according to claim 8, wherein said circuitry is characterized by period of time during which the clamp capacitor current, passing through the clamp capacitor after the main switch is turned off, reaches zero, wherein said period of time has a first duration, and wherein said directing includes changing said first duration to a second duration, the second duration being shorter than the first duration.

12. The method according to claim 8, wherein said circuitry is characterized by the clamp capacitor current, passing through the clamp capacitor after the main switch is turned off, having a first rms value, and wherein said directing includes changing the first rms value to a second rms value, the second rms value being smaller than the first rms value.

13. The method according to claim 8, wherein said electrically-connecting includes connecting an anode of the first of the two rectifiers and a cathode of the second of the two rectifiers to the clamp capacitor.

14. The method according to claim 8, wherein said electrically-connecting includes connecting the auxiliary energy storage between the ground and a cathode of the first of the two rectifiers.

15. The method according to claim 8, wherein said electrically-connecting includes connecting an anode of the second of the two rectifiers to the ground.

16. The method according to claim 8, wherein the auxiliary energy source is configured as a voltage source that is a source of bias voltage of the flyback power converter, and further comprising electrically-connecting a controlled switch in parallel with the first of the two rectifiers, said controlled switch configured to be turned "on" and "off" to maintain said bias voltage at a substantially constant level.

17. The method according to claim 8, wherein the auxiliary energy source is configured as a voltage source that is a source of bias voltage of the flyback power converter, wherein the source of bias voltage includes a bias winding at the secondary side of the transformer, the bias winding coupled with the primary winding and the driving winding of the primary side of the transformer; a bias synchronous rectifier connected to a first terminal of the bias winding; and a bias capacitor connected to a second terminal of the bias winding at a node that is grounded.

18. The electronic circuitry according to claim 8, wherein the auxiliary energy source is configured as a voltage source that is a source of bias voltage of the flyback power converter, and herein the source of bias voltage is configured to generate a bias voltage that is substantially proportional to an output voltage of the electronic circuitry measured between a terminal of the secondary winding and the ground.

* * * * *